United States Patent
Wu et al.

(10) Patent No.: US 12,265,830 B2
(45) Date of Patent: Apr. 1, 2025

(54) POWER MANAGEMENT TECHNIQUES FOR COMPUTING PLATFORMS IN LOW TEMPERATURE ENVIRONMENTS

(71) Applicant: Intel Corporation, Santa Clara, CA (US)

(72) Inventors: Min Wu, Shanghai (CN); Jun Zhang, Shanghai (CN); Yuyang Xia, Shanghai (CN); Dan Liu, Shanghai (CN); Chao Zhou, Shanghai (CN); Lianchang Du, Jiangsu (CN); Carrie Chen, Taipei (TW); Nishi Ahuja, Portland, OR (US); Jason Crop, Fort Collins, CO (US); Wenqing Lv, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 17/924,036

(22) PCT Filed: Jun. 26, 2020

(86) PCT No.: PCT/CN2020/098315
§ 371 (c)(1),
(2) Date: Nov. 8, 2022

(87) PCT Pub. No.: WO2021/258391
PCT Pub. Date: Dec. 30, 2021

(65) Prior Publication Data
US 2023/0176873 A1 Jun. 8, 2023

(51) Int. Cl.
*G06F 1/26* (2006.01)
*G06F 1/20* (2006.01)
(Continued)

(52) U.S. Cl.
CPC .............. *G06F 9/44* (2013.01); *G06F 1/20* (2013.01); *G01K 7/00* (2013.01); *G06F 1/26* (2013.01)

(58) Field of Classification Search
CPC .................... G06F 1/32; G06F 1/26
See application file for complete search history.

(56) References Cited

U.S. PATENT DOCUMENTS 5,590,061 A * 12/1996 Hollowell, II .......... G06F 1/206
714/24
8,350,711 B2 1/2013 Berke et al.
(Continued)

FOREIGN PATENT DOCUMENTS

| CN | 102929670 A | 2/2013 |
|----|-------------|--------|
| CN | 111033437 A | 4/2020 |

OTHER PUBLICATIONS

International Searching Authority, "International Search Report," issued in connection with International Appl. No. PCT/CN2020/098315, dated Apr. 2, 2021, 3 pages.
(Continued)

*Primary Examiner* — Phil K Nguyen
(74) *Attorney, Agent, or Firm* — HANLEY, FLIGHT & ZIMMERMAN, LLC

(57) ABSTRACT

Disclosed embodiments are related to techniques for powering compute platforms in low temperature environments. Embodiments include a preheating stage that is added to a power up sequence. The preheating stage may include a force-on stage and a force-offstage. During the force-on stage, all power rails of target components are forced to an ON state so that the target components consume current. When a target operating temperature is reached, the power rails of the target components are turned off, which causes the target components to revert back to their initial (pre-boot) state allowing the normal boot process to take place.
(Continued)

Since the target components are now heated up, the boot process can execute faster than when the target components were cold. Other embodiments may be described and/or claimed.

30 Claims, 11 Drawing Sheets

(51) Int. Cl.
  *G06F 9/44* (2018.01)
  *G01K 7/00* (2006.01)

(56) References Cited

U.S. PATENT DOCUMENTS

| | | | |
|---|---|---|---|
| 8,604,933 | B2 | 12/2013 | Berke et al. |
| 9,672,930 | B2 | 6/2017 | Tran et al. |
| 9,721,660 | B2 | 8/2017 | Kelly et al. |
| 9,736,887 | B2* | 8/2017 | Chiu ................... H05B 1/0227 |
| 10,141,062 | B2 | 11/2018 | Tran et al. |
| 10,303,574 | B1 | 5/2019 | Aalund et al. |
| 10,935,830 | B1* | 3/2021 | Cho .................... G02F 1/13306 |
| 2003/0236972 | A1 | 12/2003 | Harrington et al. |
| 2006/0214639 | A1* | 9/2006 | Miwa ................ H02J 7/007194 |
| | | | 320/134 |
| 2009/0018708 | A1 | 1/2009 | O'Neil et al. |
| 2010/0070745 | A1* | 3/2010 | Chiu ...................... G06F 1/206 |
| | | | 713/2 |
| 2011/0090087 | A1 | 4/2011 | Berke et al. |
| 2011/0296155 | A1* | 12/2011 | Belady ...................... G06F 9/44 |
| | | | 713/300 |
| 2013/0098891 | A1* | 4/2013 | Chiu ...................... G06F 1/206 |
| | | | 219/486 |
| 2013/0103900 | A1* | 4/2013 | Chiu .................. G06F 11/3058 |
| | | | 711/112 |
| 2013/0120149 | A1 | 5/2013 | Berke et al. |
| 2015/0091622 | A1 | 4/2015 | Dastidar |
| 2016/0048184 | A1 | 2/2016 | Basile et al. |
| 2016/0118121 | A1 | 4/2016 | Kelly et al. |
| 2016/0261455 | A1* | 9/2016 | Su ......................... H04L 41/069 |
| 2016/0351267 | A1 | 12/2016 | Tran et al. |
| 2016/0351268 | A1 | 12/2016 | Tran et al. |
| 2019/0064910 | A1 | 2/2019 | Wang et al. |
| 2020/0098658 | A1* | 3/2020 | Pinkham ................ G05D 23/30 |

OTHER PUBLICATIONS

International Searching Authority, "Written Opinion of the International Searching Authority," issued in connection with International Appl. No. PCT/CN2020/098315, dated Apr. 2, 2021, 4 pages.

International Searching Authority, "International Preliminary Report on Patentability," issued in connection with International Appl. No. PCT/CN2020/098315, dated Dec. 13, 2022, 5 pages.

European Patent Office, "Supplementary European Search Report," issued in connection with European patent Application No. 20941648.6 Feb. 16, 2024, 8 pages.

* cited by examiner

POWER MANAGEMENT TECHNIQUES FOR COMPUTING PLATFORMS IN LOW TEMPERATURE ENVIRONMENTS

RELATED APPLICATIONS

The present application is a national phase entry under 37 U.S.C. § 371 of Int'l App. No. PCT/CN2020/098315, filed Jun. 26, 2020, which designated, among various States, the United States of America, the contents of which is hereby incorporated by reference in its entirety and for all purposes.

TECHNICAL FIELD

Embodiments described herein generally relate to edge computing, and in particular, to power management, thermal management, and related configurations of computing platforms.

BACKGROUND

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and edge computing services have introduced a number of advanced use cases and scenarios occurring at or otherwise involving the edge of the network. However, these advanced use cases have also introduced a number of corresponding technical challenges related to security, processing/computing resources, network resources, service availability and efficiency, among many other issues.

The particular environment in which IoT devices and edge computing systems are deployed also introduces technical challenges. For example, computing systems tend to experience difficulties operating in low temperature environments, and in particular, have difficulties executing boot processes in low temperature environments. Existing solutions to assist computing system operating in low temperature environments are expensive to implement and/or have negative impacts to the system's components.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
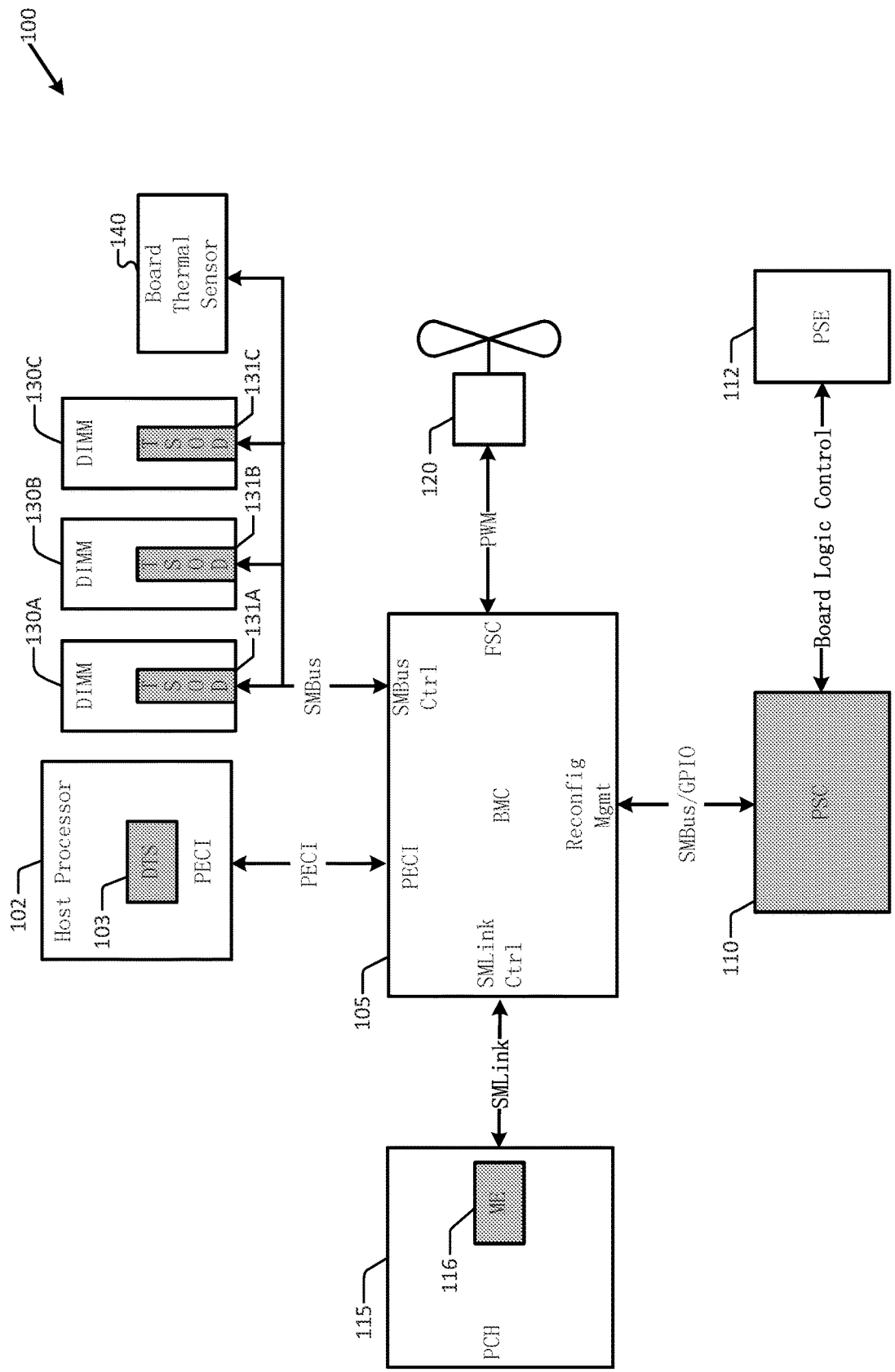
FIG. 1 depicts an example platform architecture according to various embodiments.

The following embodiments generally relate to power management and thermal management of computing platforms, and in particular, to techniques and configurations for enabling computing systems to operate in low temperature (temp) environments. This allows multiple entities (e.g., multiple tenants, users, stakeholders, service instances, applications, etc.) to be dynamically supported in a distributed computing environment such as an IoT or sensor network and/or edge computing environments.

I. Power Management and Thermal Management Embodiments

As computing systems and network technologies become more widespread, different computing systems/devices may be deployed in a multitude of areas subjecting those systems/devices to varying environmental conditions. As an example, as parts of servers are migrate from the cloud (e.g., data centers) to edge computing environments, these servers may experience environmental conditions different than those typically encountered within a data center. In another example, IoT devices, such as autonomous sensors, may environmental or other sensor data, and as such, may need to be deployed in a multitude of environments from inside factories or manufacturing plats, inside other devices, in urban environments, and wilderness regions. These environmental conditions include low temp environments (e.g., at or below zero degrees centigrade (0° C.)).

The particular environment in which computing systems are deployed can impact system performance. Computing systems and/or individual integrated circuits (ICs) are usually given a temperature grade or rating, which indicates a normal operating temp range for the system or IC.

Temp grades are typically based on the intended purpose or application of a particular system/component. Individual manufacturers define their own temp grades, however, broadly accepted temp grades are shown by table 1, where the listed maximum (max) and minimum (min) temps are given in centigrade or Celsius (° C.).

TABLE 1

| Grade | Min. Temp (° C.) | Max. Temp (° C.) |
|---|---|---|
| Commercial | 0 | 70 |
| Industrial | −40 | 85 |
| Military | −55 | 125 |

Temp grades may be applied to individual components (e.g., individual chips, ICs, or the like) and/or to a computing system as a whole. For purposes of the present disclosure, the term "device" refers to individual components within a computing system, a combination of components of a computing system (e.g., a "subsystem" or the like), and/or an entire computing system. The use of temp grades ensures that a device is suitable for its intended application, and will withstand external/ambient environmental conditions. Normal operating temp ranges are affected by several factors such as, for example, power dissipation of the device. Many devices require a thermal solution to maintain temps within the normal operating temp range. Operation of a device outside of its normal operating temp range may result in performance degradation and/or permanent damage to the device. For electrical devices, the operating temp may be the junction temp ($T_J$) of the semiconductor in the device. The junction temp is affected by the ambient temp. The junction temp of ICs may be expressed as: $T_J \simeq T_a + P_D \times R_{ja}$, wherein $T_J$ is the junction temp in ° C., $T_a$ is the ambient temp in ° C., $P_D$ is the power dissipation of the IC in watts (W), and $R_{ja}$ is the junction to ambient thermal resistance in ° C./W.

Device operation in low temp environments (e.g., below 0° C.) may improve some device performance characteristics such as, for example, increased gain, high speed, low leakage, low parasitics in interconnections, reduced noise, and improved heat transfer. Although low temp environments may improve some performance characteristics, low temp operation may negatively effect other device performance characteristics that may lead to poor performance and/or device malfunction including, for example, memory retrieval failures, alteration of oscillator frequencies, and slow system start up.

Additionally, devices can be damaged during the power-up sequence. This is because the boot process may cause electricity to flow through the device's circuits at a relatively high rate, causing the circuitry (e.g., surface mount components (SMCs), through-hole components (THCs), solder joints, vias, and/or the like) to expand rapidly, which may distort their shape and/or cause them to break. The rapid change in temp during the boot process may also cause condensation to take place within the device, which may cause other malfunctions.

One existing low temp boot up solution includes using a thermal coupler (or "thermocouple") to pre-heat platform components. However, thermocouples increase customer bill or material (BOM) costs and may have negative impacts on thermal dissipation. Another existing low temp boot up solution includes repeatedly re-booting a computing system's processor, which may eventually boot up with heat accumulated during a reset flow. However, these solutions may introduce additional wear to the silicon that may reduce the device's lifespan. Another existing low temp boot up solution involves halting the CPU during a reset phase to extend the reset duration to make the CPU self-heat. However, long reset phase durations is not covered by normal validation scope and may cause system instability after exiting the reset phase. Furthermore, this solution only covers CPU cold boot temp problems, but does not preheat other devices within a system.

According to various embodiments, a new "preheating" power stage (also referred to as a "force-on" phase or stage) is added to a power up sequence. During the preheating phase, all power rails are turned on and power good signal(s) is/are asserted so that the power rails can heat all the high thermal design point (TDP) components on a board such as, for example, processor, PCH, network interface controller (NIC), logic devices, and/or other ICs/chips within the system. In some embodiments, the system shuts down the power rails and/or de-asserts the power signals after a configurable duration or when an a suitable operating temp is detected, and returns to a boot starting point (e.g., the point at which the "force-on" phase was started) so that the normal boot sequence can commence. Other embodiments and/or implementations may be described and/or claimed.

The embodiments discussed herein provide a relatively non-complex solution to heat platform components without cost increases and that are compliance with current platform designs and power management specifications such as Advanced Configuration and Power Interface (ACPI) Specification, version 6.3 (January 2019) provided by the Unified Extensible Firmware Interface (UEFI) Forum™ (hereinafter "[ACPI]"). The embodiments herein can be achieved using a platform power sequence controller and may be provisioned in existing platforms via firmware updates to avoid expensive and complex hardware redesigns or reconfigurations. The embodiments herein also have little to no impacts on silicon life cycle. Furthermore, the preheating embodiments may allow platforms and/or individual devices to perform beyond (below) the minimum temp of their conventional temp grades, which may conserve resources that would usually be used to make more systems/components more robust in order to operate in low temp environments.

Referring now to FIG. 1, which depicts an example architecture of a platform 100 in which aspects of the present disclosure may be practiced. The platform 100 is an assembly or interconnection of devices (or "chipset") that work together to deliver one or more specific computing functions. As examples, the platform 100 may be a motherboard, a Multi-Chip Package (MCP), a System-on-Chip (SoC), a System-in-Package (SiP), included in a complete computing system such as a server (e.g., blade, rack-mount, etc.), edge compute node, edge server node, workstation, desktop computer, laptop or notebook computer, a network switch, a networking device (e.g., routers, modems, bridge devices, gateway devices, etc.), a smartphone, a wearable device, an IoT device, a networked appliance, and/or other like computer systems.

The platform 100 may be independent of any operating system, user applications, or user data. In some cases, the platform 100 does not include any software other than platform firmware as part of the devices in the platform. Platform firmware is a collection of firmware elements used to operate platform devices, and generally includes platform boot firmware and platform runtime firmware. The platform boot firmware is a collection of all boot firmware on the platform 100. The platform boot firmware is initially loaded by the platform 100 at power-on for basic initialization of the platform 100 hardware and then control is handed over to a boot loader or operating system (OS). In some cases, the platform boot firmware will be x86 BIOS, UEFI Core System BIOS, or something else entirely. The platform boot firmware has no further role once control has been handed over to the boot loader or the OS. The platform runtime firmware is a collection of all run-time firmware on a platform. This is firmware that can provide functions that can be invoked by an OS, but are still concerned only with the platform hardware (e.g., Power State Coordination Interface (PSCI) for the ARM architecture).

In the example of FIG. 1, the platform 100 includes a host processor 102, Baseboard Management Controller (BMC) 105, a power sequencing controller (PSC) 110, power sequencing element (PSE) 112, Platform Controller Hub (PCH) 115, a fan 120, a set of dual inline memory modules (DIMMs) 130 (including DIMMs 130A, 130B, and 130C), and a board thermal sensor 140. The platform 100 may also include additional or alternative devices than those shown by FIG. 1 such as, for example, a graphics processing unit (GPU), a power button, and/or other like devices. In alternative implementations, the platform 100 BMC 105 may not be included and the PCH 115 may include some or all of the functionality of the BMC 105 as discussed herein. Other device arrangements and implementations are possible in other embodiments.

The host processor 102 is the primary processing unit in the platform 100 that executes instructions that perform various functions. The host processor 102 is a part of a platform 100 on which a primary (host) operating system (and/or hypervisor), as well as user applications run. The host processor 102 may also be referred to as a Central Processing Unit (CPU), an Application Processing Unit (APU), a System on Chip (SoC), or the like. The host processor 102 is responsible for loading and executing Host Processor Boot Firmware (HPBF) and Host Processor Runtime Firmware (HPRF). The HPRF is any runtime firmware that executes (runs) on the host processor 102. The HPBF is firmware loaded and executed by the host processor 102, which provides basic boot capabilities for the platform 100. The terms "host processor," "boot processor," and "bootstrap processor" may be considered synonyms for purposes of the present disclosure. The HPBF may include System BIOS firmware such as legacy Basic Input/Output System (BIOS) and/or Unified Extensible Firmware Interface (UEFI). Expansion ROM Firmware (ERF) may also be embedded as part of the HPBF, or may be separate from the HPBF (e.g., loaded from an add-in card). The ERF is firmware executed on the host processor 102, which is used by an add-in device during the boot process. This includes Option ROM Firmware and UEFI drivers.

In various embodiments, the host processor 102 comprises one or more processor cores, an "uncore," one or more I/O interfaces, and a package. A processor core is a silicon (Si) die that may contain one or more multiple execution cores. Each execution core has an instruction cache, data cache, and a level 2 (L2) cache. Each of the execution core may share a level 3 (L3) cache. A processor core power supply is reverred to as "VCC" or the like. The uncore is a portion of the host processor 102 comprising shared last level cache (LLC) cache, caching agent (Cbo), integrated memory controller (IMC), home agent (HA), power control unit (PCU), configuration agent (Ubox), integrated I/O controller (IIO), and an interconnect (IX) link interface. The host processor 102 implements a ring topology IX between the core and uncore elements as used by the IX interface.

The LLC is the highest-level cache shared by the processor cores that is called before accessing memory 130. The LLC comprises a section for each core slice instantiated, which collectively represent one logical cache. The Cbo comprises logic providing a ring interface to the LLC and the cores. The Cbo handles all core and PCIe to IX messages and system interface logic. In some implementations, there may be one Cbo per core in a given socket. The IX interface allows the processor to send and receive data or signals over an IX. In one implementation, the IX is Intel® Ultra Path Interconnect (UPI), which is a cache-coherent, link-based Interconnect specification for Intel® processors, chipsets, and I/O bridge components. The HA is a coherent agent responsible for guarding the IMC module and handles all the memory read/write requests to the memory. The IMC is a controller integrated into the processor 102 diethatr provides an interface to the DIMMs 130 via the IX. The IMC communicates to the rest of the host processor 102 through the HA. The PCU is a power and thermal manager for the host processor 102 that runs firmware on an internal microcontroller and coordinates the socket for its power states. The IIO is also a controller that is integrated into the processor 102 die. In some implementations, the IIO may include one or more DMI interfaces to the PCH 115, one or more PCIe interfaces, one or more Universal Serial Bus (USB) interfaces, and/or the like. The UBox acts as the centralized unit for a variety of non-coherent type of transactions and functions such as dispatching interrupts to the appropriate core; decoding and routing transactions to uncore registers; implementing time stamp counters, scratch pad registers, performance monitor (PerfMon) infrastructure support, and so forth; and serializing locks/unlock, quiescent messages to the Lock Master in the legacy socket.

The host processor 102 (or individual processor cores) may also include other elements such as a data stream buffer, data translation look-aside buffer, instruction cache unit, instruction fetch unit, instruction queue, and/or other like elements. In some implementations, the host processor 102 also includes an Integrated Heat Spreader (HIS), which is a component of the processor package used to enhance the thermal performance of the package. Thermal solutions of other components may interface with the host processor 102 at the IHS surface.

Furthermore, a platform voltage regulator may be integrated into the host processor 102. Due to this integration, the host processor 102 may have a power supply pin (voltage rail) (VCCIN). The VCCIN voltage rail supplies the integrated voltage regulators, which in turn regulate appropriate voltages via respective voltage rails to the cores, cache, system agent, and I/O interfaces. These voltage rails may include, for example, an I/O voltage rail (VCCIO), a system agent or interconnect voltage rail (VCCSA), a voltage rail for the processor's 102 memory interface (VCCD), and a ground voltage rail (Vss). The other devices of platform 100 may have similar voltage rails as the host processor 102 in some implementations.

A "power supply rail" or "voltage rail" refers to a single voltage provided by a power supply unit (PSU) (not shown by FIG. 1). A voltage rail may be supplied from the PSU to a particular pin of a device, or may be an internally generated voltage rail that is derived from another voltage rail. The PSU may convert alternating current (AC) power into one or several direct current (DC) voltages (e.g., positive and negative 3.3 volts (V), 5V, and 12V), each of which is known as a rail. The power supply rail is usually located on a power plane layer of the printed circuit board (PCB) of the platform 100 and is routed to the various power pins of each chip/IC. The ground pins of each chip/IC may be connected to a ground plane of the PCB with vias at those pins. The term "power plane" may refer to [[a flat plane of a conductive metal (e.g., copper or the like) connected to a power supply or PSU to provide a relatively steady supply of voltage to the platform 100. A portion of a chip/IC that is powered from a particular voltage rail is referred to as a "power well" or simply a "well."

The host processor 102 also includes one or more digital thermal sensors (DTS) 103. In some implementations, each processor core of the host processor 102 includes a respective DTS 103. The DTS 103 is/are on-die, analog-to-digital temperature converters that provide a digital representation of relative processor temp. Data from the DTS 103 are processed and stored in a processor register, which is queried by the BMC 105 through the Platform Environment Control Interface (PECI). PECI is a proprietary one-wire interconnect (IX)/bus interface that provides a communication channel between the host processor 102 and chipset components to external thermal monitoring devices (e.g., BMC 105). The BMC 105 includes a thermal controller (ctrl) that uses the processor temp readings from the DTS 103 to control the cooling device 105.

The Platform Environment Control Interface (PECI) bus uses a single wire for self-clocking and data transfer, and requires no additional control lines. The physical layer is a self-clocked one-wire bus that begins each bit with a driven, rising edge from an idle level near zero volts. The duration of the signal driven high depends on whether the bit value is a logic '0' or logic '1'. PECI also includes variable data transfer rate established with every message. The single wire interface provides low board routing overhead for the multiple load connections in the congested routing area near the processor and chipset components. Bus speed, error checking, and low protocol overhead provides adequate link bandwidth and reliability to transfer critical device operating conditions and configuration information. PECI reports a negative value expressing the difference between the current temp and the thermal throttle point or temp threshold, which is a temp where the host processor 102 reduces its speed or shuts down to prevent damage due to overheating.

Each DIMM 130 comprises a series of dynamic random-access memory (DRAM) ICs mounted on a printed circuit board (PCB). Collectively, the set of DIMMs 130 is used to provide system memory for the platform, and as such, the set of DIMMs 130 may be referred to as "system memory 130" or the like. As examples, the DIMMs 130 may be double data-rate (DDR) 4 synchronous DRAM (SDRAM) modules or other like memory devices such as those discussed herein (see e.g., system memory 1054 of FIG. 10). Each DIMM 130 is plugged into a slot on the platform 100, and each slot is connected to a memory channel. Multiple DIMMs 130 can be connected to the same memory channel, but when this is done, those DIMMs share the same command/data connection, which allows for increased capacity, but not bandwidth. Each physical address in the system 100 is mapped to a specific channel/DIMM that is connected into the host processor 102. A read/write command is issued on the command bus, and data is returned (if a read) or sent along with the write command on the data bus. The relevant DIMM on the channel determines that the command is for it and processes the request. Each DIMM 130A-C also includes a respective thermal sensor on-die (TSOD) 131A-C. Each TSOD 131 provides a single temp reading for its DIMM 130 (e.g., an entire stick of memory). In various implementations, there is only a single TSOD on a DIMM 130, which is located near the center of the DIMM 130 in the lengthwise direction. The BMC 105 (or PCH 115) reads this temp over the System Management Bus (SMBus).

The board thermal sensor 140 may be any type of temp sensor or collection of temp sensors used to monitor the ambient temp of the platform 100. As examples, the board thermal sensor 140 may be a thermocouple, Resistance Temp Detector (RTD), thermistors, a bipolar junction transistor (BJT) for temp sensing, a temp IC (e.g., DTS, TSOD, etc.), and/or the like. In some implementations, the board thermal sensor 140 may be one or more remote temp sensors used by a sensor chip (e.g., the BMC 105, PCH 115, PSC 110, etc.) remote from the thermal sensor 140.

The fan 120 is used for actively cooling the platform 100 by moving heated air away from the components of the platform 100 (e.g., expelling warm air from inside a case or housing of the platform 100 (not shown)) and drawing cooler air over the platform 100 devices (e.g., drawing cooler air into the case or housing). The fan 120 may be used in combination with a heat sink to increase the area of heated surface in contact with the air, thereby improving the efficiency of cooling. In some implementations, there may be multiple fans 120 controlled by the fan speed controller (FSC). The FSC is used to control the fan 120, and the speed of the fan 120, by driving one or more (e.g., four) pulse width modulated (PWM) signals over a PWM connector (e.g., a 4-pin Molex connector or the like). The FSC samples one or more (e.g., eight) tachometer input signals (e.g., FAN_TACH_[0:N] signals where N is a number tachometer input signals minus 1) to measure the speed of the fan 120. The PWM signal(s) is/are driven as an open-drain. An external pull-up resistor may be implemented to provide the rising edge of the PWM output signal(s). The PWM output signal(s) (e.g., FAN_PWM_[0:M] signals where M is a number PWM output signals minus 1) is/are driven low during reset, which may represent a 0% duty cycle to the fan 120. In some implementations, the FSC may have an interface to the DTS 103, a DTS of the PCH 115 (not shown), and/or to the board thermal sensor 140 to determine a current temp of those devices or the platform 100 as a whole. As discussed in more detail infra, the FSC may halt the operation of the fan 120 during a preheating stage of a power up sequence when the platform 100 is attempting to power up in a low temperature environment.

In some implementations, any other cooling device used to transfer heat away from the platform 100 and/or otherwise cool the platform 100 or individual components of the platform 100 may be used instead of the fan 120. Examples of these cooling devices include heatpipes, water cooling, liquid nitrogen, submersive liquid cooling, refrigeration, and/or the like. In some implementations, the fan 120 may be used in conjunction with one or more of these alternative cooling mechanisms.

The PCH 115 provides the platform 100 with centralized platform/support capabilities used in conjunction with the host processor 102 including, inter alia, timing/clock capabilities, input/output (I/O) capabilities, manageability capabilities, and power management capabilities. In some implementations, the PCH 115 may be part of a same package as the host processor 102, which is referred to as a "Multi-Chip Package" or "MCP."

For the timing/clock capabilities (also referred to as "clock circuitry", "timing circuitry" or the like), the PCH 115 may provide one or more single-ended and differential clocks to synchronize operations and data propagations system wide between multiple interfaces across multiple clock domains. The PCH 115 provides these system clocking capabilities through an Integrated Clock Controller (ICC), which generates various platform clocks from a timing/clock source. The ICC may include Phase lock loops (PLLs), modulators, and dividers for generating various clocks (clock signals) for different needs of the platform 100 or individual components. The PCH 115 may include a real-time clock (RTC) IC that keeps track of the current time for the platform 100. The RTC may be a crystal oscillator, a power line frequency generator, or a micromechanical resonator. The RTC may also include its own power supply that is separate from the power supply used for the other devices in platform 100. In one implementation, the RTC IC and/or ICC utilizes a crystal oscillator to provide a source frequency of 14.31816 MHz. In another implementation, the RTC IC and/or ICC is a crystal oscillator operating at a 32.768 kHz clock frequency. In either of these implementations, the RTC IC may also be coupled to a 3 volt (V) battery to maintain the system time when the system is powered off. The PCH 115 may also employ Spread Spectrum Clocking (SSC), where the clock chip continually varies its output frequency over a small range (e.g., 0.5%) centered around the base frequency. In various implementations, the PCH 115 may include multiple clocks to provide different clock inputs to various devices that have different timing requirements.

For the I/O capabilities (also referred to as "I/O circuitry", "interface circuitry", or the like), the PCH 115 may include various I/O controllers including, for example, General Purpose I/O (GPIO) controller, direct media interface (DMI) controller, Intel® Flexible Display Interface (FDI) controller(s), VGA interface controller(s), Peripheral Component Interconnect Express (PCIe) controller(s), universal serial bus (USB) controller(s), eXtensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), etc.), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. The I/O capabilities may also include communication or networking capabilities. In these embodiments, the PCH 115 may comprise a network interface controller such as, for example, a Gigabit Ethernet Controller or the like.

For the manageability capabilities, the PCH 115 includes a Management Engine (ME) 116, which is an autonomous subsystem that allows system administrators to perform tasks on the platform 100 remotely. The ME 116 may run as long as the motherboard is receives power, even when the system is turned off. As examples, the ME 116 may be an Intel® Manageability Engine part of Intel® Active Management Technology (AMT), AMD Secure Technology® provided by AMD®, or the like. The ME 116 may also incorporate or include a Trusted Platform Module (TPM) and/or provide a Trusted Execution Environment (TEE) (see e.g., TEE 1090 of FIG. 10).

For the power management capabilities, the PCH 115 may include a Power Management Controller (PMC) that handles power management related activities for the PCH 115 and/or other devices of the platform 100. The PMC administers power management functions of the PCH 115 including interfacing with other logic and other devices/controllers on the platform 100 to perform power state transitions (e.g., S3 sleep control signal (SLP_S3 #), platform reset signal (PLTRST #), etc.); configure, manage and respond to wake events; aggregate and report latency tolerance information for devices and peripherals connected to and integrated into the PCH 115. In one example, PCU 115 may select a power state for one or more devices of the platform 100, and may cause the devices of the platform 100 to transition from a sleep state to an active state, or vice versa. In another example where the platform 100 is connected to a battery, the PCU 115 may control battery power usage, battery charging, and features related to power saving operations.

The PCH 115 also supports various ACPI aspects, such as those discussed in [ACPI]. For example, the PCH 115 may support enhanced clock control and various low power (e.g., suspend or sleep) states. In addition, the ME 116 may provide wake events from various sleep (suspend) states. In some implementations, the PCH 115 may include a DTS (not shown), which may be used for thermal management of the platform 100. Additionally or alternatively, each of the various I/O controllers may include their own thermal sensors for thermal management purposes. In the example of FIG. 1, the PCH 115 reports thermal/temp readings over a System Management Link (SMLink) interface to an SMLink controller in the BMC 105, which allows the BMC 105 to used the PCH 115 thermal data for platform 100 thermal management. Here, the SMLink interface may be a SMBus link between the PCH 115 and BMC 105. Additionally, the PCH 115 may be configured to report thermal sensor readings when the system is in one or more power states, such as those defined by [ACPI].

The Baseboard Management Controller (BMC) 105 is a specialized microcontroller embedded on the platform 100 that manages the interface between system-management software and platform hardware. In some implementations, different sensors built into the platform 100 and/or computer system report various parameters (e.g., sensor data) to the BMC 105. For example, the board thermal sensor 140 may report temp measurements or values to the BMC 105 via the SMBus, the TSOD's 131 may report temp readings of their respective DIMM 130 over the SMBus, the cooling element 120 when implemented as a cooling fan may report cooling fan 120 speeds to the BMC's 105 fan (hub controller (ctrl) via a pulse-width modulation (PWM) connector, the DTS 103 in the host processor 102 may report thermal data to the BMC 105 via the PECI link, and so forth. The BMC 105 monitors these sensors and can send alerts to a user of the platform 100 and/or a system administrator via a network if any of the parameters do not stay within pre-set limits, indicating a potential failure of the system. The administrator can also remotely communicate with the BMC to take some corrective actions.

The BMC 105 includes a System Management Bus ("SMBus" or "SMB") host controller that controls or otherwise communicates with the DIMMs 130 and the thermal sensor 140 over an SMBus. The BMC 105 also includes a SMLink host controller that controls or otherwise communicates with the PCH 115 over an SMLink. The SMLink and the SMLink host controller may be an SMBus and SMBus host controller, respectively, configured to handle system management communications with the PCH 115. The SMBus is a two-wire interface based upon the PC protocol. The SMBus is a low-speed bus/IX that provides positive addressing for devices, as well as bus arbitration. In some embodiments, the SMBus may be used to communicate with other devices such as the PSC 110, Smart Batteries, Smart Battery Chargers, contrast/backlight control, and the like. In other implementations, other bus/IX technologies may be used instead of SMBus such as Power Management Bus (PMBus) and/or other IX technologies discussed herein. In some implementations, the BMC 105 includes a single SMBus controller that is configured to communicate with each of the PSC 110, PCH 115, DIMMs 131, and board thermal sensor 140. In other implementations, a general-purpose I/O (GPIO) and/or Simple Peripheral Bus (SPB) controller(s) and the BMC 105 may communicate with the PSC 110 over a GPIO (or SPB) interface or connection.

The PSC 110 is a device (or collection of devices) that handles the power on sequence that the platform 100 should follow from a system off condition (also referred to as a "mechanical off" state or the like). When external power is first applied to the platform 100, a number of tasks are carried out before the host processor 102 can begin running applications. These tasks may include allowing the power supply to settle down to a nominal state and deriving voltage levels needed on the platform 100. For example, in some implementations a number of different voltage rails (e.g., 1.5 volt (V), 3.3 V, 5 V, and 12 V) are derived from a 12 V input supply (see e.g., Intel®, "Desktop Platform Form Factors Power Supply Design Guide," Document 336521, Revision 002 (June 2018) ("ATX12V")). In other implementations, a single voltage rail (e.g., 12 V) is used from a 12 V input supply (see e.g., Intel®, "ATX12VO (12V Only) Desktop Power Supply Design Guide," Document 613768, Revision 002 (May 2020) ("ATX12VO")).

Powering-up the platform 100 and its components generally requires that the voltage rails be applied in a particular order or sequence to ensure safe operation of the platform 100. The process of providing the voltage rails in the predefined order or sequence is referred to as "power sequencing." The specific power sequencing is implementation specific and varies from embodiment to embodiment, but usually involves asserting signals for specific devices/components of the platform 100 in a predefined order. A signal is asserted (e.g., "activated") when its logical state is set (e.g., forced) to "true" or "1", and de-asserted (e.g., "deactivated") when its logical state is set (e.g., forced) to "false" or "0". For example, if a signal is active when its voltage is logical high, then asserting that signal or rail means setting it to logic high (e.g., 3.3V, 5V, etc.) and de-asserting that signal or rail means setting it to a logic low (0V). The power sequencing is forced by way of "power good" signals from one state to the next. Voltage regulators are commonly available with this power good type of output signal, that becomes active when the regulators output is valid. When all of the sequencing operations are complete and/or the power rails of the platform 100 devices are valid, a final power good signal is detected by the PSC 110 causing the PSC 110 to de-assert a reset line to the host processor 102. At this point the host processor 102 will begin executing the HPBF.

The power sequencing is controlled by power sequencing logic, which comprises discreet logic stored and operated by the PCH 115 and/or the BMC 105, as well as power sequencing code present on the PSC 110. The power sequencing logic may be part of the platform boot firmware. The PSC 110 drives the power sequencing process and tracks all the signaling that takes place when power is supplied to the platform 100 from the mechanical off state until the platform reset signal is detected, which indicates the start of the host processor 102 fetching code.

In some implementations, the PSC 110 also comprises asynchronous DRAM refresh (ADR) logic, which preserves data in the system memory 130 in the event of a power supply failure. The ADR logic does this by providing an early warning to the host processor 102 of an impending reset or power failure so that the host processor 102 can save critical information while the reset is in progress.

In some implementations, the PSC 110 is an embedded controller such as, for example a power management controller (PMC), power management IC (PMIC), or the like. In other implementations, the PSC 110 is a logic device (or combination of logic devices) that is/are configurable by a logic pattern that describes the structure and behavior of the logic device (e.g., PSC 110) during operation. The PSC 110 may also include a memory device (e.g., silicon antifuses, SRAM, EPROM, flash memory, etc.) to store the logic pattern. As examples, the logic device (PSC 110) may be one or more programmable logic devices (PLD), programmable logic arrays (PLA), programmable array logic devices (PAL), simple PLDs (SPLD), complex PLDs (CPLD), field-programmable gate arrays (FPGA), high-capacity PLDs (HPLDs), programmable switches, programmable application-specific ICs (ASIC), and/or any other programmable logic or custom logic device (or combination thereof).

The PSE 112 represents the various board-level power sequencing related components used for powering the platform 100. These components may include, for example, metal-oxide-semiconductor field-effect transistors (MOSFET) logic gates, the PMC of the PCH 115, voltage regulators, a power supply unit (PSU) connector, and the like. The PSE 112 may also include a power supply voltage rail (or PSU rail) that supplies a supply voltage (VCCP) to power each device of the platform 100. In the example of FIG. 1, the PSE 112 is shown as being connected to the PSC 110 via a "board logic control" reference point/interface. The board logic control is not a specific interface. Instead, the board logic control represents all of the single-ended signals to control, enable/disable the board level power sequencing related components. In one example, the PSC 110 may send an "FM_PS_EN" signal to the PSE 112 (e.g., MOSFET) to enable the PSU. In this example, the "FM_PS_EN" is a board logic signal and the MOSFET acts as invertor.

As mentioned previously, the devices of the platform 100 may support ACPI aspects. ACPI is an architecture-independent power management and configuration framework that forms a subsystem within a host OS. The ACPI framework establishes a hardware register set to define various power states (e.g., sleep, hibernate, wake, etc.). The various power states include global system states (Gx states). In [ACPI], the Gx states apply to the entire system and are visible to a user. The Gx states include G0 ("working state") where the system is fully on and running (e.g., dispatching and executing application threads, etc.), G1 ("sleeping state") where the system consumes a relatively small amount of power and user application threads are not executing, G2 ("soft off state") where the system consumes a minimal amount of power and no application code is running, and G3 ("mechanical off state") where little or no electrical current is running through the circuitry of the platform 100. The mechanical off state (G3) is defined as one where power consumption is very close to zero such as when a power plug has been removed or disconnected. However, the RTC device still runs off a battery. The G3 state is entered by any power failure, such as an accidental or user-initiated power loss. The platform 100 exits the G3 state by mechanical means, for example, by pressing a power button, flipping a switch, or connecting a power supply.

ACPI also defines various sleeping and soft-off states (Sx states) including S1-S4 states that are sleeping states within the global system state (G1) that have different wake latencies, and an S5 state which is a soft-off state associated with the G2 system state (see e.g., [ACPI]). In some implementations, the PCH 115 may support a "Deep Sx" state to minimize power consumption while in S3/S4/S5. The Deep Sx state is a lower power, lower featured version of these power states where system context may or may not be maintained depending upon entry condition. In the Deep Sx state, all power is shut off except for minimal logic that allows exiting the Deep Sx state. In the Deep Sx state, the Suspend wells are powered off, while the Deep Sleep (Sx) Well (DSW) remains powered. A limited set of wake events are supported by the logic located in the DSW. While in Deep Sx, the PCH monitors and responds to a limited set of wake events (e.g., RTC Alarm, Power Button, and WAKE #). Upon sensing an enabled Deep Sx wake event, the PCH 115 brings up the suspend well by de-asserting a DeepSx Indication signal (SLP_SUS #or SLP_SUS_N).

The ACPI power sequencing for Intel® x86 architecture systems involves the system transitioning from the mechanical off state G3 to the soft-off state S5 when power returns to the system, which means the system will remain off until a power button is pressed or some other wake event occurs. From the soft-off state S5, the system transitions to sleeping state S3. Then, from the sleeping state S3, the system transitions to the working state G0 (S0).

According to various embodiments, a new preheating power stage is added to the power sequencing logic, such as to the power sequence code implemented by the PSC 110. The preheating power stage may be a new Advanced Configuration and Power Interface (ACPI) power sequencing stage, an openPOWER power sequencing stage, Advanced Power Management (APM) power sequencing stage, the MultiProcessor Specification (MPS) power sequencing stage, Plug and Play (PnP) BIOS power sequencing stage, and/or added to some other power management protocols. In some implementations, the new preheating power stage is inserted between the G3 and S5 states of the ACPI power sequence. In other implementations, the new preheating power stage is inserted between the S5 and S3 states of the ACPI power sequence. In either implementation, the preheating power stage is executed when the ambient temp of the platform 100 is detected to be at or below a predefined ambient temp. As an example, the predefined ambient temp may be between −40° C. and −20° C.

The preheating power stage forces one or more platform 100 components to an ON state so that those components start to consume current and heat up. While the components consume current during the preheating power stage, reset signals for these components are halted or held so that these components will start their initialization while not performing bootup tasks. In this way, the platform 100 components will be self-heated but will not execute tasks. When the components achieve a predefined operating temp (or boot temp), the system will force a shutdown of these components. As an example, the predefined operating temp may be between 0° C. and −10° C. The forced shutdown may include turning off the power rails and/or de-asserting various signals. This allows the system to return to the initial state prior to being powered on, and therefore, the system will perform the normal power-up sequence. Since the system components have been heated up prior to being brought back to the initial state, the system is able to boot up faster than is possible using the existing power up sequencing without the preheating power stage.

Figure 2:
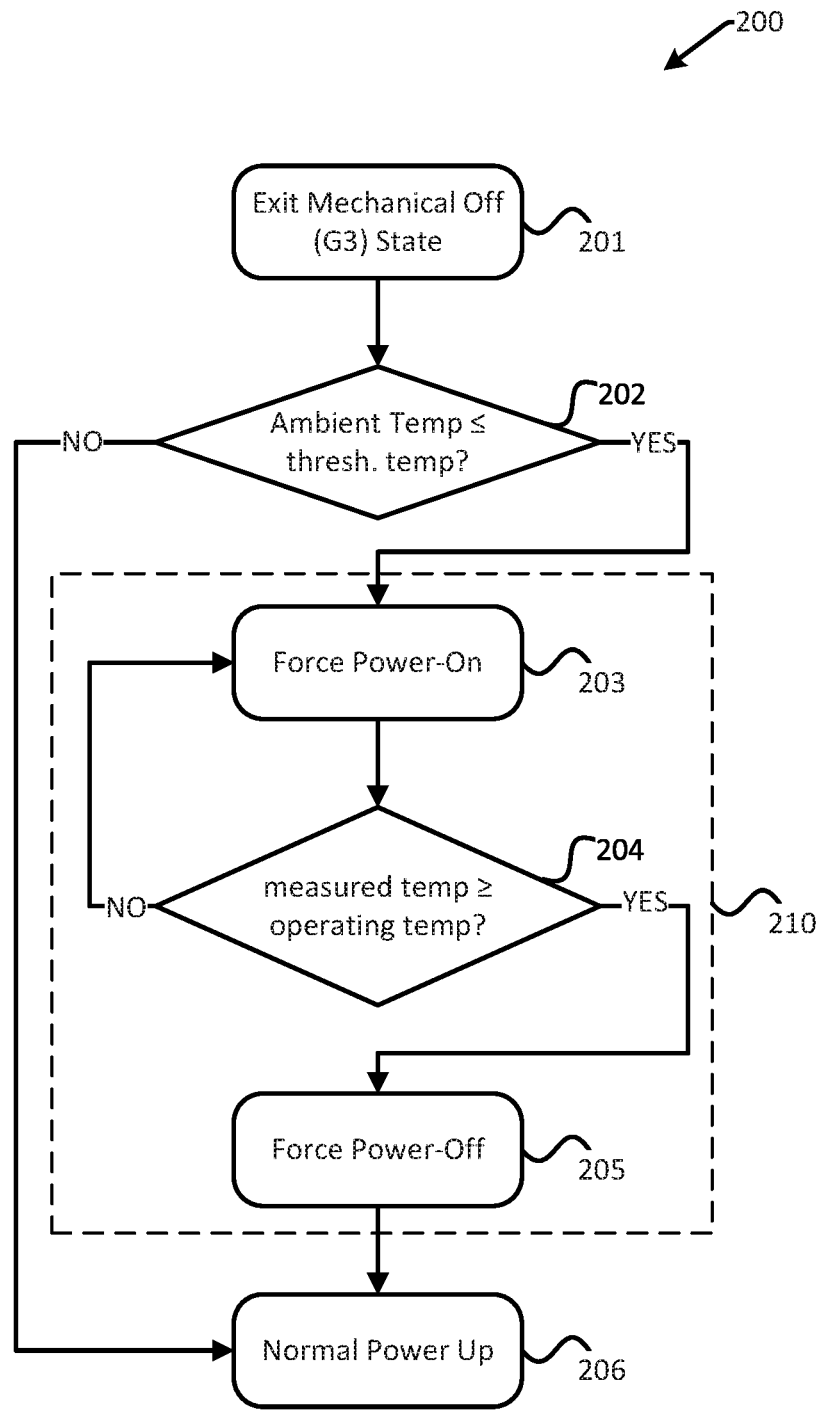
FIG. 2 illustrates example power sequence processes, according to various embodiments.

FIG. 2 shows an example power sequencing process 200 that includes a preheating stage 210, according to various embodiments. While particular examples and orders of operations are illustrated in FIG. 2, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

The power sequence process 200 begins at operation 201 where the platform 100 exits a mechanical off state (referred to as the "G3 state" in [ACPI]). In this example, the platform 100 may exit the G3 state when the mechanical means are engaged. Next, at operation 202, the PSC 110 determines whether the platform 100 is attempting to power-up in a low temp environment, such as when the ambient temp is less than or equal to a threshold temp. If the platform 100 is not in a low temp environment (e.g., the ambient temp is greater than the threshold temp), then the PSC 110 proceeds to operation 206 to execute a normal power up sequence and boot process. If the platform 100 is in a low temp environment (e.g., the ambient temp is less than or equal to the threshold temp), then the PSC 110 enters the preheating stage 210. The preheating stage 210 may be entered when the ambient temp (e.g., as indicated by the board thermal sensor 140, TSODs 131, DTS 103, and/or other like thermal sensors) is a threshold level such as, for example 0° C. or the like.

In alternative embodiments, instead of the PSC 110 performing operation 202, the BMC 105 may perform operation 202. In these embodiments, the BMC 105 monitors the platform 100 ambient temp (e.g., as measured by the board thermal sensor 140) and/or the temp(s) of one or more target components (e.g., as measured by the DTS 103, DTS of the PCH 115, and/or TSODs 131) to determine if the ambient temp of the platform 100 and/or the temp of individual target component(s) is at or lower than a threshold temp (e.g., at or below −40° C. or the like). When the BMC 105 determines that the pre-power up (ambient) temp is at or lower than the threshold temp for low temperature environments, the BMC 105 sends a suitable indication to the PSC 110 to start the preheating stage 210 or enter the Force Power-On stage 203 (e.g., a "force-on indication" or the like).

In this embodiment, the preheating stage 210 includes operations 203 and 204. At the "Force Power-On" operation 203, the PSC 110 causes the platform 100 components to start initialization with boot up processes halted. At operation 203, the PSC 110 may force the power rails on and asserts all power good indicators except one or more boot up indicators such as the platform reset signal (PLTRST #) and/or the like. Assertion of the PLTRST #is called a Host Reset or Host Partition Reset. In embodiments, PLTRST #is held low. The host processor 102 needs CPU_PWROK to indicate power rail ready and to start initialization of SVID and PECI, which is enough to heat the host processor 102. In general, the PCH 115 asserts the PLTRST #to reset other devices on the platform 100 such as a Super IO (SIO) device, PCIe devices, NIC, host processor 102, and so forth. Additionally, the PSC 110 may assert a PCH Power OK signal (PCH_PWROK) to the PCH 115 to indicate that all of its core power rails have been stable for at least 5 ms. PCH_PWROK is an active-high signal, which indicates all power rails achieve a default value when the signal becomes "1" (e.g., 3.3V or 1.0V). When PCH_PWROK is negated or held low, the PCH 115 asynchronously asserts PLTRST #. Therefore, in this example, the PSC 110 may keep PCH_PWROK de-active (or low) or otherwise negate PCH_PWROK to prevent the PCH 115 from triggering a global power cycle reset. This is because PCH_PWROK being high or asserted means that all PCH 115 power rails are OK.

Then, the target devices of the platform 100 (e.g., host processor 102, PCH 115, etc.) will start initialization so that the temp of these devices will increase. Since the boot up indicators (e.g., PLTRST #, etc.) are not active, the system will remain in initialization stage and will not boot up. This allows the platform 100 devices to accumulate heat but avoid entering the boot up process. Additionally, during the Force Power-On stage 203, all system cooling mechanisms (e.g., fan 120 or the like) can be halted by the BMC 105 or PSC 110. For example, the PSC 110 may drive (or instruct the BMC 105 or the PCH 110 to drive) the PWM signal(s) low during the Force Power-On stage 203.

At operation 204, the PSC 110 determines whether a measured temp of the target components, or the platform 100 itself, is at or above a desired operating temp. In embodiments, the PSC 110 may determine that the target (threshold) operating temp has been met after a predetermined or configured time period (e.g., about 70 seconds or the like).

In some embodiments, the PSC 110 may obtain temp measurements from the BMC 105, which may include temp data of the platform 100 as measured by the board thermal sensor 140, temp data of the host processor as measured by the DTS 103, temp data of the PCH 115 as measured by its DTS (not shown by FIG. 1), and/or temp data of individual DIMMs as measured by their respective TSODs 131. If the measured temp is not at or above the desired operating temp, the PSC 110 proceeds back to the Force Power-On operation 203. If the measured temp is at or above the target operating temp, the PSC 110 proceeds to the Force Power-Off operation 205, where the PSC 110 controls all the power rails to be turned off.

In alternative embodiments, instead of the PSC 110 performing operation 204, the BMC 105 may perform operation 204. In these embodiments, the BMC 105 monitors the platform 100 temp (e.g., as measured by the board thermal sensor 140) and/or the temp(s) of one or more target components (e.g., as measured by the DTS 103, DTS of the PCH 115, and/or TSODs 131) to determine if the target component(s) and/or the platform 100 reached the target operating temp. When the BMC 105 determines that the target operating temp has been reached (or exceeded), the BMC 105 sends a suitable indication to the PSC 110 to enter the Force Power-Off stage 205 (e.g., a "force-off indication" or the like).

After the predetermined or configured duration and/or when the PSC 110 receives the force-off indication/signal from the BMC 105, the PSC 110 proceeds to the "Force Power-Off" operation 206 to return to the initial boot state. Here, the initial boot state may be a point in the boot-up process before the preheating stage 210 took place. At operation 206, the PSC 110 asserts one or more signals to one or more platform 100 devices (e.g., the PCH 115 or the like) to run the normal power up and/or boot sequence. The power sequence process 200 ends after performance of operation 206.

Figure 3:
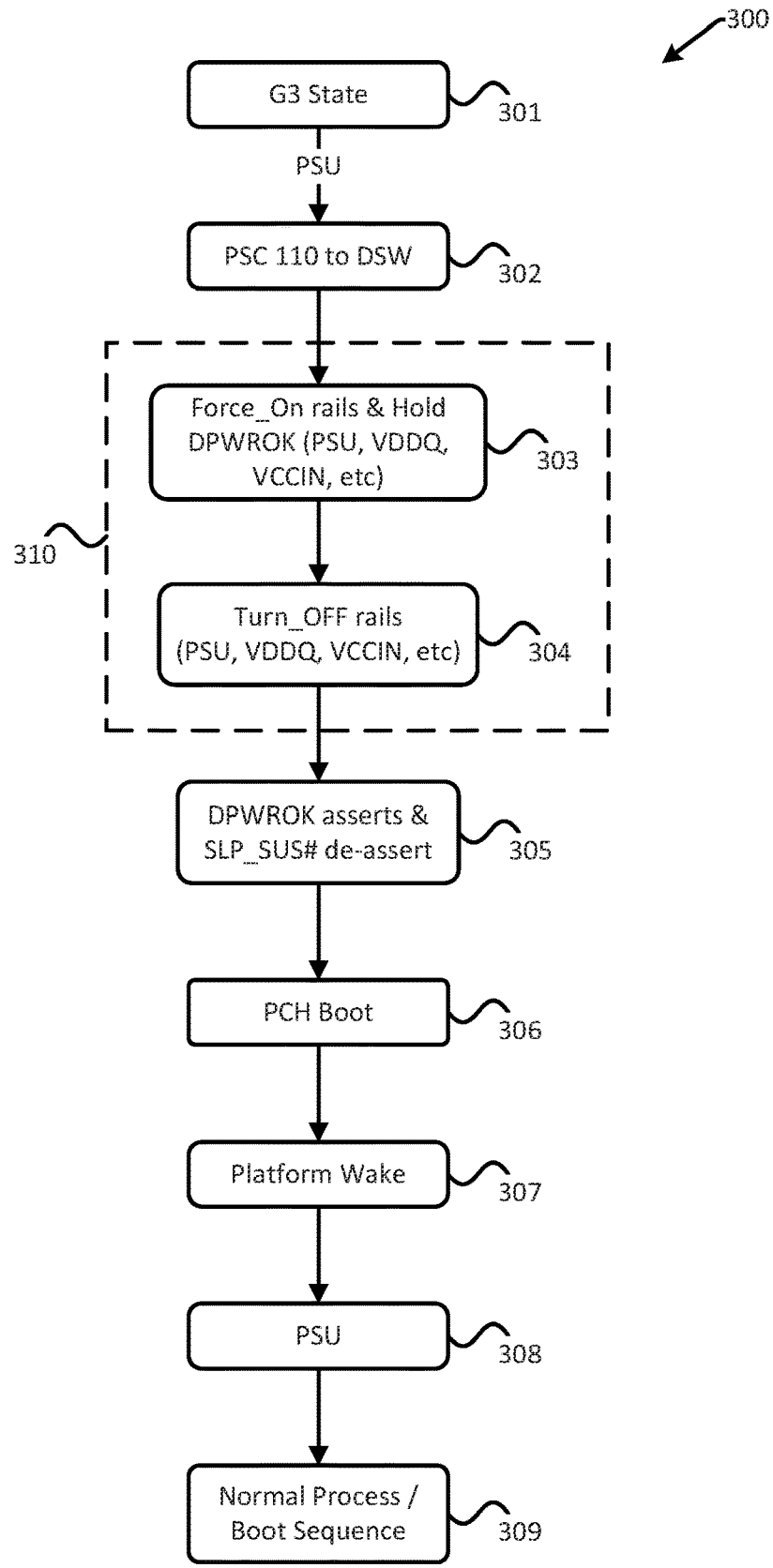
FIG. 3 illustrates another example power sequence processes, according to various emboments.

FIG. 3 shows another example power sequencing process 300 including a preheating power stage 310 according to various embodiments. Power sequencing process 300 begins at operation 301 where the system (platform 100) is in the G3 state. From the G3 state, a PSU supplies AC power to the platform 100, which powers the PSC 110 at operation 302. In one example, a voltage rail or pin of the PSC 110 is powered to 3.3V causing the PSC 110 to enter the DSW state.

Next, the PSC 110 begins the preheating power stage 310, which includes operations 303 and 304. At operation 303, the PSC 110 performs a force on and holds one or more power good indication signals such as the DSW power OK signal (referred to as "DPWROK", "DSW_PWROK", or the like). The PSC 110 holds the DPWROK to halt the boot process for the PCH 115. DPWROK (or DSW_PWROK) is a Power OK Indication for the VCCDSW3_3 voltage rail. The VCCDSW3_3 supplies power to the DSWs of various components, such as the DSW of the PCH 115. The DPWROK signal is in the RTC well. Meanwhile, PSC 110 forces various power rails on and asserts corresponding power good signals to heat up target components (e.g., the host processor 102, the PCH 115, etc.). For example, the PSC 110 may assert the VCCP voltage rail for the PCH 115, the VCCIN voltage rail for the processor 102, and a main memory system 130 voltage rail (VDDQ). Additionally, in some embodiments, the system cooling elements 120 can be halted during the Force_ON stage 303. This can be achieved via the BMC 105 thermal management interface.

At operation 304, the PSC 110 turns the power rails off and de-asserts the corresponding power good signals when a target device temp has been reached. In some embodiments, the PSC 110 can use a timer for turning on the rails and asserting the signals, and may turn the rails off an de-assert the signals when the timer expires.

In another embodiment, the BMC 105 assists the PSC 110 to manage the time of the Force_ON stage 303. In these embodiments, the BMC 110 may continuously poll the board thermal sensor 140, the DTS 102, and TSODs 131 to obtain temp information for the platform 100, the host processor 102, and the memory system 130, respectively. Once the temp information indicates that these components' temp has reached or exceeded a target temp, the BMC 105 sends a message (e.g., a target temp indicator) to the PSC 110 over the GPIO link or SMBus to quit the Force_On stage 303 and turn off all the power rails and de-assert the signals at operation 304. The BMC 105 can communicate with the PSC 110 through the interface between the BMC 105 and PSC 110. In some embodiments, the signal from various platform sensors to the BMC 105 follows the I2C protocol except for the DTS 103 over the PECI. In an example, the BMC 105 may obtain temperature readings from the DTS 103 over the PECI using GetTemp( ). In another example, the signal from the BMC 105 to the PSC 110 over the GPIO interface could be a single-ended signal such as "FM_Force_Off." In another example, the signal from the BMC 105 to the PSC 110 over the SMBus may be a write command to a predefined register of the PSC 110 (e.g., a CPLD register or the like), which indicates a Force Off request from the BMC 105. The PSC 110 turn the rails off and de-assert the signals in response to receipt of a target temp indicator from the BMC 105. This target temp indicator may indicate that particular devices have reached the target temp. In this embodiment, the BMC 105 may send a target temp indicator for each of the target components (e.g., a first target temp indicator for the host processor 102, a second target temp indicator for the PCH 115, and so forth). Shutting all of the power rails down and de-asserting the signals causes the target components to reset to an initial state.

At operation 305, the PSC 110 asserts the DPWROK (or DSW_PWROK signal) and de-asserts SLP_SUS #(or SLP_SUS_N). The DSW_PWROK is a power OK indication for the VCCDSW3_3 voltage rail, which is a 3.3V voltage supply for the DeepSx wells of the PCH 115. When DSW_PWROK goes high, the PCH 115 will drive the SLP_SUS #high. When the PCH 115 is planning to enter the Deep Sx power state, the PCH 115 removes Primary power using SLP_SUS #. Asserting the SLP_SUS #(driven low) indicates that the PCH 115 is in the Deep Sx state, and de-asserting the SLP_SUS #(driven high) indicates an exit from Deep Sx state and power can be applied to PCH 115.

At operation 306, the PCH 115 performs its own boot process. For example, the PCH 115 may perform a SUSWARN #/SUSACK #handshake to ensure the platform 100 is ready to enter Deep Sx. The PCH asserts SUSWARN #as notification that it is about to enter Deep Sx. Before the PCH proceeds and asserts SLP_SUS #, the PCH waits for SUSACK #to assert. While in Deep Sx, the PCH 115 monitors and responds to a limited set of wake events (e.g., RTC Alarm, Power Button, and WAKE #). Upon sensing an enabled Deep Sx wake event (e.g., at operation 307), the PCH 115 brings up the suspend well by de-asserting SLP_SUS #.

At operation 307, the PSC 110 activates sleeping/wake logic to wake the platform 100 in response to detecting a wake event. The sleeping/wake logic will sequence the system into the defined low-power hardware sleeping state (S1-S4) or soft-off state (S5) and will wake the system back to the working state upon a wake event. While in any of the sleeping states (G1), an enabled wake event will cause the hardware to sequence the system to the working state (G0). When waking from the S1 sleep state, execution control is passed to the OS, whereas when waking from the S2-S4 sleep states execution control is passed to the platform boot firmware (execution begins at the host processor's 102 reset vector). Examples of the wake events include power button signal (PWRBTN) assertion, RTC alarm, PCIe wake event, wake alarm device events, and network wake events.

The PWRBTN is asserted or de-asserted anytime the power button is pressed. The PWRBTN will cause a system control interrupt (SCI) to indicate a system request to go to a sleep state if the platform 100 is in the working state (G0). If the system is already in a sleep state, the PWRBTN will cause a wake event. During a G3 exit, the PWRBTN is asserted at least until SLP_SUS #de-asserts to be registered by the PCH 115 as a valid wake event.

A network wake event or wake-on-LAN (WoL) signal are wake events that are based on network activity, such as a change in link status or the reception of a wake frame over a network. Link status wake events are based on a change in network availability such as detecting a link establishment. This may be used to trigger the platform 100 to enter a higher level sleep state from a lower level sleep state (e.g., from S3 to S2), which would be used to detect wake frames. Wake frame events are used to wake the system whenever meaningful data is presented to the system over the network such as, for example, a management request from a remote administrator, or simply network traffic directly targeted to the system.

At operation 308, the PSC 110 turns on the PSU by, for example, asserting the power supply ON signal (PSON #). PSON #is an active low Transistor-Transistor Logic (TTL) signal that turns on all of the main power rails.

At operation 309, the PSC 110 executes a normal boot sequence. For example, in some embodiments, the PSC 110 may assert a system power OK signal (SYS_PWROK) to the PCH 115 to inform the PCH 115 that power is stable in other components, and that the platform 100 is ready to start the exit from the reset state. Additionally or alternatively, the PSC 110 may assert a PCH power OK signal (PCH_PWROK) to the PCH 110 to indicate that all of the PCH's 115 core power rails have been stable for at least 5 ms. The PCH 115 may then eventually assert a power good signal (PWRGOOD) to the host processor 102, which resets all the states in the host processor 102. In some embodiments, may assert a RESET_N signal with the PWRGOOD to the host processor 102 to perform a Cold Reset (or a Power On Reset).

The platform 100 waits for a Base Clock (BCLK) and the power to be stable before asserting the PWRGOOD. This results in reset of all the states in the host processor 102. PLLs come up, and I/O (e.g., DMI2, Intel® UPI, PCIe, and DDR) links undergo initialization and calibration. Components in fixed and variable power planes are brought up. Ring, router, SAD, and various lookup tables in the core and/or Cbo are initialized. Once the uncore initialization has completed, then the power is enabled to the cores and cores are brought out of reset. The platform boot firmware (e.g., BIOS, UEFI, etc.) is fetched either from the PCH 115 (or fetched from a platform boot firmware chip (e.g., flash memory) over IX links. The platform boot firmware then accesses a boot sector and loads a bootloader into the system memory 130. The platform boot firmware then passes execution control to the bootloader, which loads the initial OS image from storage circuitry into system memory and passes execution control to the OS. After performance of operation 309, the power sequencing process 300 ends.

Figure 4:
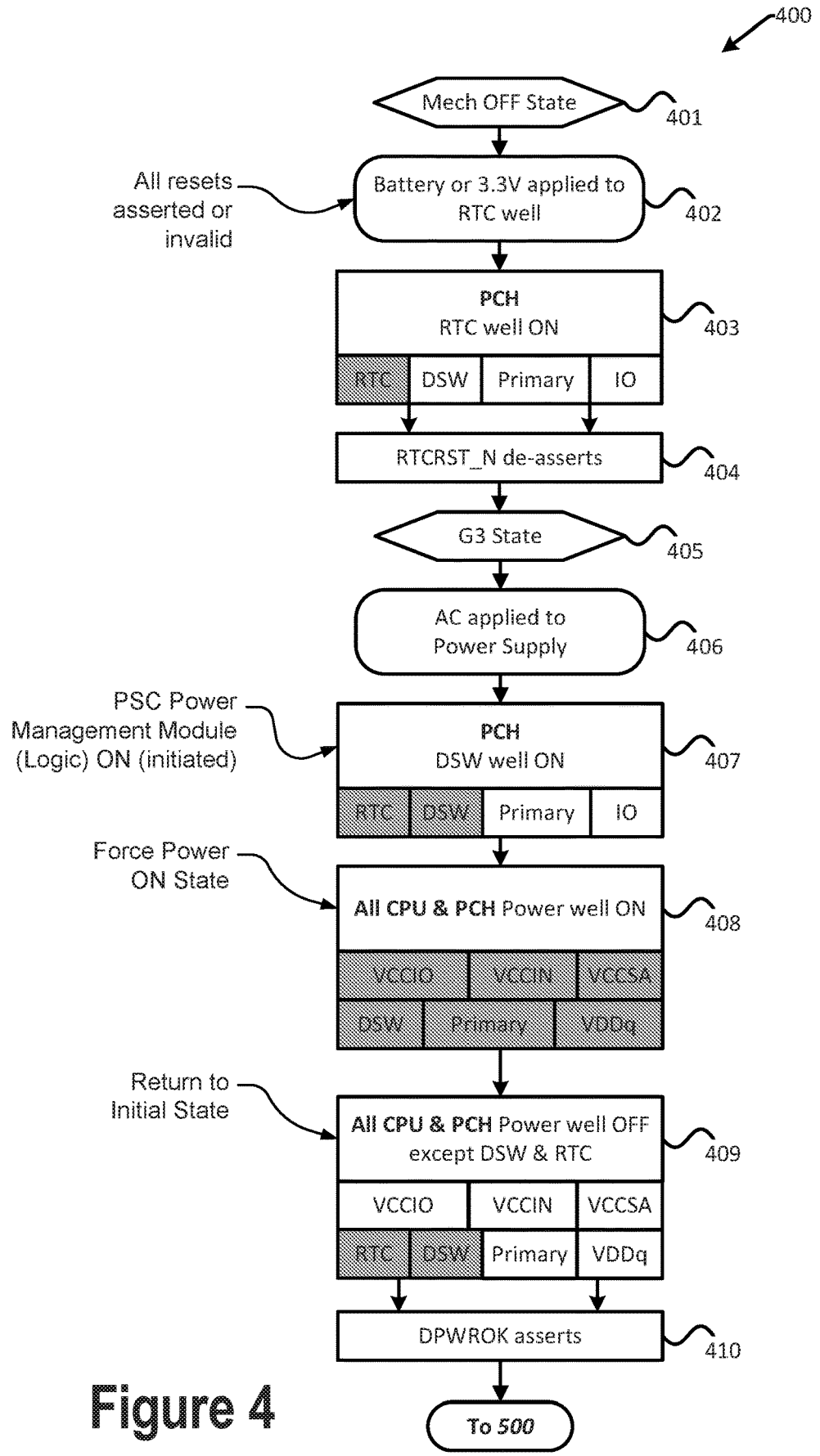
FIGS. 4-6 illustrate another example power sequence process according to various embodiments.
Figure 5:
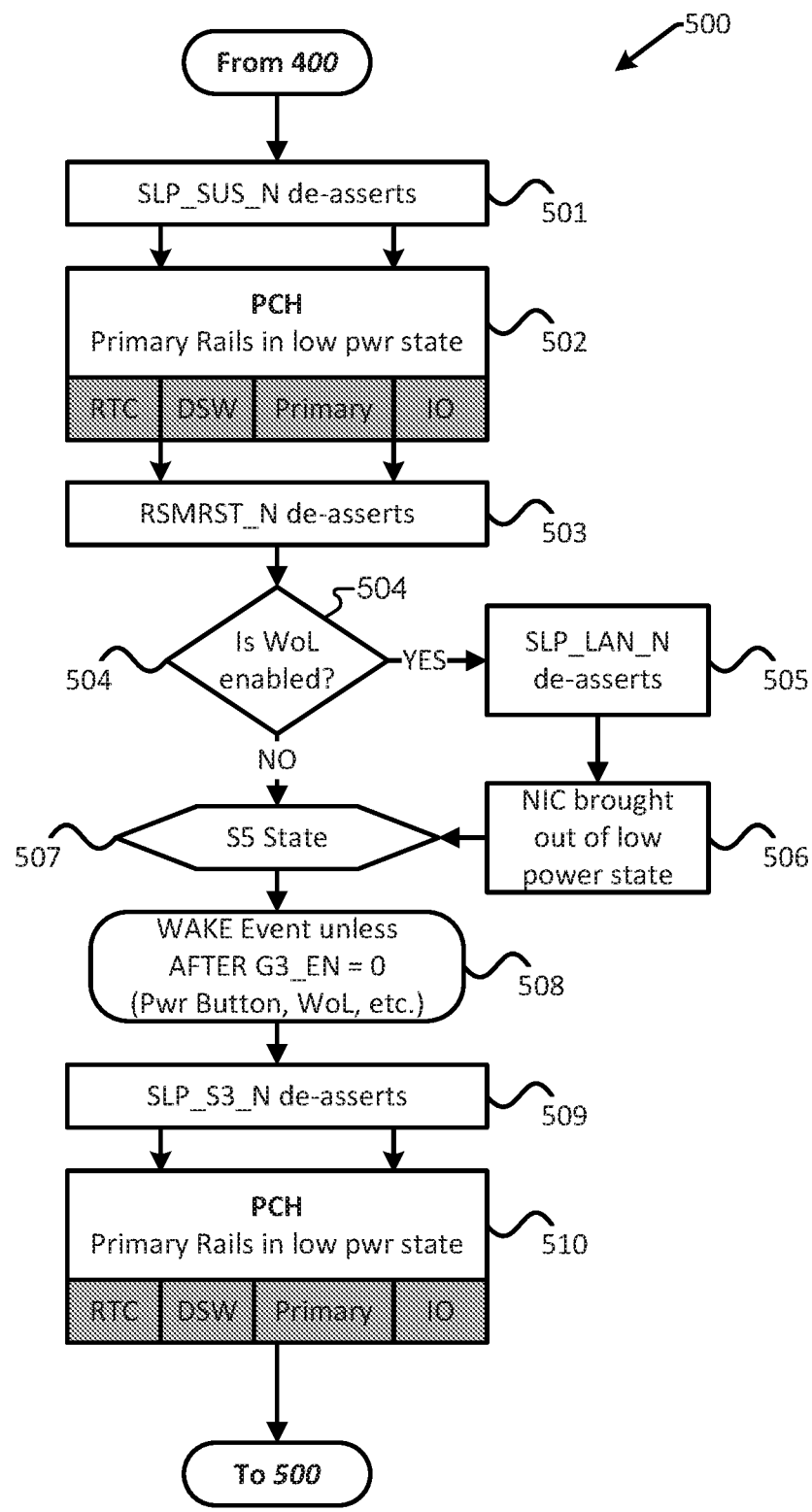
Figure 6:
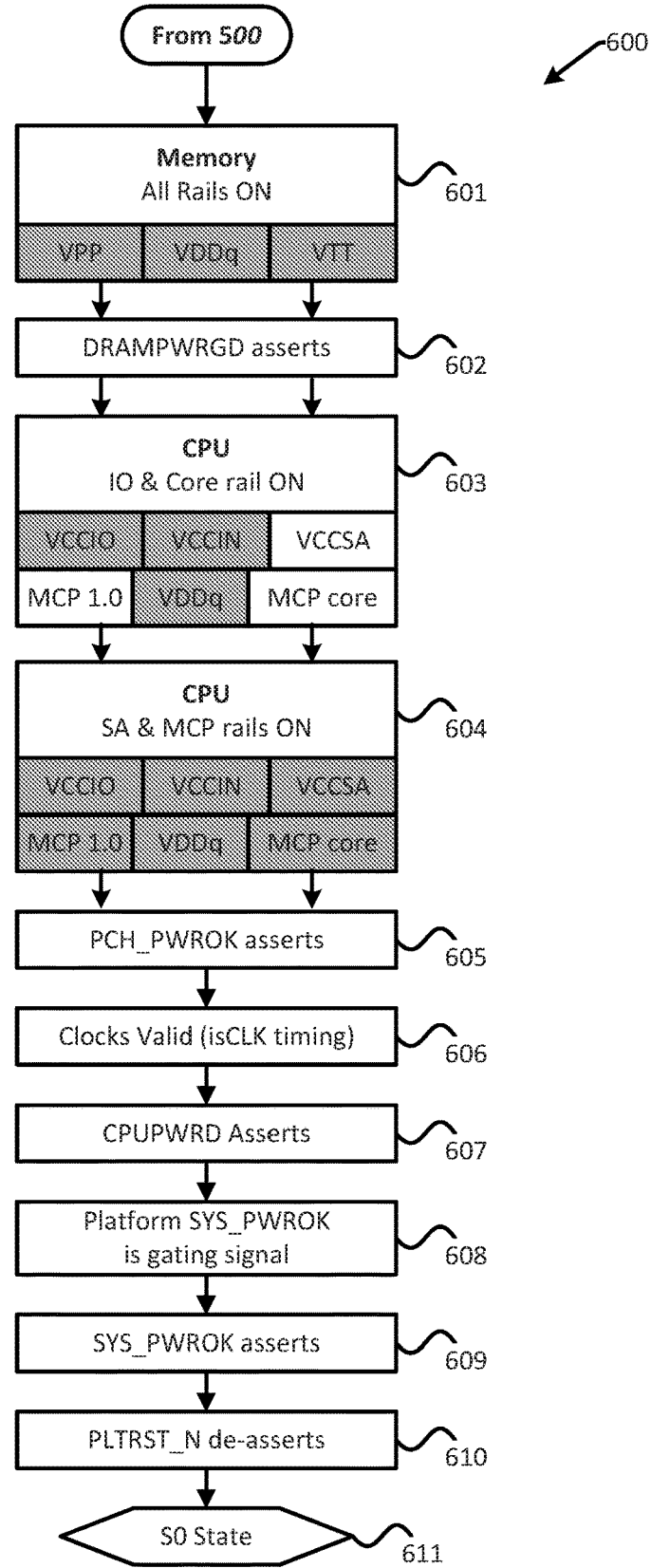

FIGS. 4-6 show a socket level power up sequence (including sub-processes 400-600, respectively) according to various embodiments. While particular examples and orders of operations are illustrated in FIGS. 4-6, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

The socket level power up sequence begins with sub-process 400 of FIG. 4 where the platform 100 is in a mechanical off state (G3) (401). Only a battery or 3.3V is applied to an RTC well (402) where all resets are asserted or invalid. Additionally, a PCH 115 RTC well is in an ON state (403) or is enabled (as indicated by the grey box labeled "RTC" at operation 303 in FIG. 4). An RTC reset signal (e.g., RTCRST_N) is de-asserted (404). This signal is asserted to reset PCH registers in the RTC well to their default value.

From the G3 state (405), AC is applied to the PSU (406) and a DSW well of the PCH 115 is enabled (as indicated by the grey box labeled "DSW" in FIG. 4). Here, the PSC 110 Power Management Module/Logic is initiated or in an ON state (407). Next, the Force Power ON stage is executed where all host processor 102 and PCH 115 power wells (e.g., including the VCCIO, VCCIN, VCCSA, DSW, Primary and VDDq wells in FIG. 4) are enabled or forced to an ON state (408). Here, the primary well is equivalent to the historical Suspend well such that the supply is on in S0, S3, S4, and S5 states. The Primary well may be powered by a VccPrimary voltage rail, VCC_3p3 voltage rail, and/or the like After a period of time or when a predefined target temp is reached, a Force Power OFF stage is executed where all host processor 102 and PCH 115 power wells, except DSW and RTC wells, are disabled or forced to an OFF state (409). This returns the host processor 102 and the PCH 115 to their initial state for initializing the boot process. DPWROK is asserted (410), which causes the PCH 115 to initiate the boot process.

Referring to sub-process 500 of FIG. 5, the SLP_SUS_N de-asserts (501) indicating an exit from Deep Sx state and power can be applied to PCH 115. The PCH 115 primary rails are then placed in a low power state (502) where the RTC, DSW, Primary, and IO wells are enabled. The resume well reset signal (RSMRST_N) de-asserts (503) so that various PCH 115 registers are no longer reset. The RSMRST_N (and/or or RSMRST #) is a primary well signal that is used for resetting the resume power plane logic. When high, this pin indicates that all power rails associated with the PCH 115 Primary well are valid and stable. This signal must be asserted for at least T201 after the primary wells are valid; and/or this signal must be asserted for at least 10 ms after the suspend power wells are valid. When de-asserted, this signal is an indication that the primary power wells are stable.

If network wake events (e.g., WoL) is enabled (504), then a network interface controller (NIC) sleep control signal (e.g., SLP_LAN_N or SLP_GBE_N) de-asserts (504), a NIC is brought out of low power state (505), and the platform 100 is placed in the S5 state (507). If network wake events (e.g., WoL) are not enabled (504), then the platform 100 is placed in the S5 state (507). When the NIC sleep control signal (e.g., Gigabit Ethernet (GBE) Sub-System Sleep Control) is de-asserted, this signal indicates that a physical layer (PHY) device of the NIC needs to be powered. When the NIC sleep control signal is asserted, this signal indicates that power can be shut off to the PHY device.

A wake event is issued unless an AFTERG3_EN bit is set to 0 (e.g., PWRBTN, WoL, etc.) (508). The AFTERG3_EN bit determines what state to go to when power is re-applied after a power failure (G3 state). This bit is in the RTC well and is not cleared by any type of reset except writes to RTCRST #. Then, an S3 sleep control signal (e.g., SLP3_N, SLP_S3 #, or the like) de-asserts (509), and the PCH 115 primary rails are enabled and placed in low power state (510). The S3 sleep control signal is for the power plane control and shuts off power to all non-critical systems when in S3, S4, or S5 states.

Referring to sub-process 600 of FIG. 6, all rails of the system memory 130 are enabled or set to ON (601), and a DRAM power good signal (DRAMPWRGD) asserted to the host processor 102 to indicate that the memory 120 power is normal (602). Next, the host processor's 102 I/O and core rails (e.g., VCCIO, VCCIN, and VDDq) are enabled or set to ON (603), and then the host processor's 102 system agent (SA) rails (e.g., VCCSA) and MCP rails (e.g., MCP 1.0, MCP core) are enabled or set to ON (604). Then, a PCH power OK signal (PCH_PWROK) is asserted to the PCH 115 to indicate that all of its core power rails have been stable for at least 5 ms (605). The PCH 115 outputs a Clocks Valid signal (isCLK timing) (606), and a processor power good signal (CPUPWRD or PROC_PWRGD) is asserted by the PCH 115 to the host processor 102 to indicate that the primary power is ramped up and stable (e.g., "good").

A Platform System Power OK signal (SYS_PWROK) is set to be a gating signal (608), and SYS_PWROK is asserted to the PCH 115 (e.g., by the PSC 110) (609). A gating signal is a digital signal (or "trigger") that provides a time window so that a particular event or signal from among many will be selected and others will be eliminated or discarded. The SYS_PWROK is a generic power good signal input to the PCH 115, which is driven and utilized in a platform-specific manner (e.g., specific to platform 100). While the PCH_PWROK indicates that the core wells and/or primary wells of the PCH 115 are stable, the SYS_PWROK is used to inform the PCH 115 that power is stable to some other system component(s) and the system (platform 100) is ready to start the exit from reset.

Next, a platform reset signal (PLTRST_N or PLTRST #) is de-asserted (610). As mentioned previously, the PCH 115 asserts PLTRST # to reset devices on the platform 100. The PCH 115 asserts PLTRST # during power-up and when S/W initiates a hard reset sequence through the Reset Control register (I/O port CF9h). The PCH 115 drives PLTRST # active a minimum of 1 ms when initiated through the Reset Control register (I/O port CF9h). After the platform reset takes place, the platform 100 enters working state G0/S0 (611).

Example Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at network access nodes (NANs), radio access network (RAN) nodes, gateways, network routers, bridge devices, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to edge computing configurations provided within Multi-Access Edge Computing (MEC) and 5G network implementations. However, many other standards and network implementations are applicable to the edge and service management concepts discussed herein. For example, the embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

Figure 7:
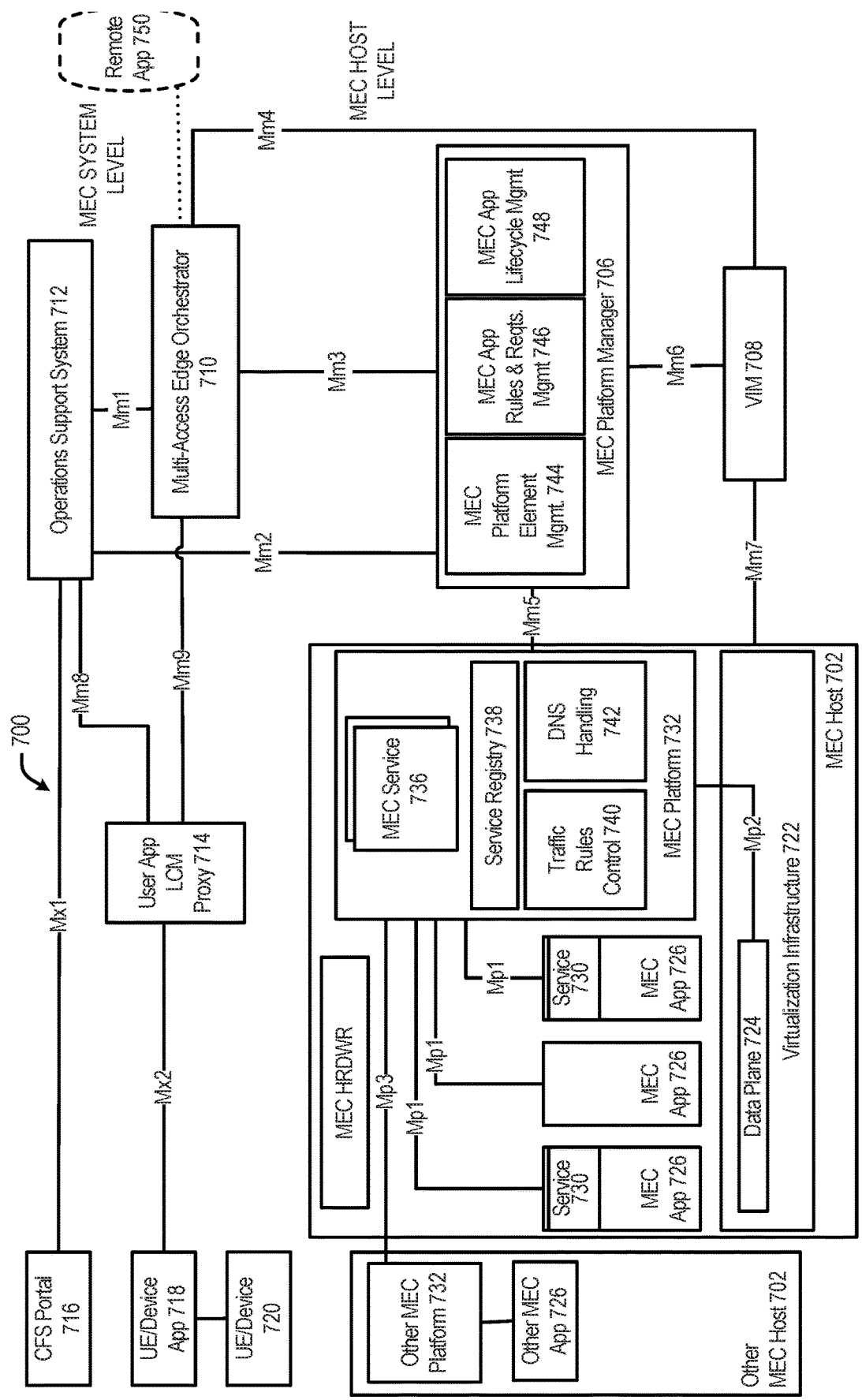
FIG. 7 illustrates an example MEC system reference architecture.

FIG. 7 illustrates a MEC system reference architecture (or MEC architecture) 700 providing functionalities in accordance with ETSI GS MEC 003 v2.1.1 (2019-01) ("[M03]"). MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 700 includes MEC hosts 702, a virtualization infrastructure manager (VIM) 708, an MEC platform manager 706, an MEC orchestrator 710, an operations support system (OSS) 712, a user app proxy 714, a UE app 718 running on UE 720, and CFS portal 716. The MEC host 702 includes a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726 upon virtualization infrastructure (VI) 722. The MEC apps 726 can be configured to provide services 730, which can include processing network communications traffic of different types associated with one or more wireless connections (e.g., connections to one or more RANs or core network functions) and/or some other services such as those discussed herein. The other MEC host 702 may have a same or similar configuration/implementation as the MEC host 702, and the other MEC app 726 instantiated within other MEC host 702 can be similar to the MEC apps 726 instantiated within MEC host 702. The VI 722 includes a data plane 724 coupled to the MEC platform 722 via an MP2 interface. Additional interfaces between various network entities of the MEC architecture 700 are illustrated in FIG. 7.

In some implementations, the MEC host 702 comprises one or more servers (also referred to as a "MEC server" or "edge server"), each of which may include the platform 100 of FIG. 1. In some implementations, the MEC platform 732 and/or MEC platform manager 706 may comprise one or more platforms 100 of FIG. 1. In some implementations, the VI 722 and/or VIM 708 can include one or more servers, each of which include the platform 100 of FIG. 1. In each of these implementations, the aforementioned MEC elements may perform the preheating power up according to the various embodiments discussed herein.

The MEC system 700 includes three groups of reference points, including "Mp" reference points regarding the MEC platform functionality; "Mm" reference points, which are management reference points; and "Mx" reference points, which connect MEC entities to external entities. The interfaces/reference points in the MEC system 700 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The logical connections between various entities of the MEC architecture 700 may be access-agnostic and not dependent on a particular deployment. MEC enables implementation of MEC apps 726 as software-only entities that run on top of a VI 722, which is located in or close to the network edge. A MEC app 726 is an application that can be instantiated on a MEC host 702 within the MEC system 700 and can potentially provide or consume MEC services 736.

The MEC entities depicted by FIG. 7 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and ULE 720, and is discussed in more detail infra. The MEC host level includes one or more MEC hosts 702, 704 and MEC management entities, which provide functionality to run MEC Apps 726 within an operator network or a subset of an operator network. The MEC management entities include various components that handle the management of the MEC-specific functionality of a particular MEC platform 732, MEC host 702, and the MEC Apps 726 to be run.

The MEC platform manager 706 is a MEC management entity including MEC platform element management component 744, MEC app rules and requirements management component 746, and MEC app lifecycle management component 748. The various entities within the MEC architecture 700 can perform functionalities as discussed in [M03]. The remote app 750 is configured to communicate with the MEC host 702 (e.g., with the MEC apps 726) via the MEC orchestrator 710 and the MEC platform manager 706.

The MEC host 702 is an entity that contains an MEC platform 732 and VI 722 which provides compute, storage, and network resources for the purpose of running MEC Apps 726. The VI 722 includes a data plane (DP) 724 that executes traffic rules 740 received by the MEC platform 732, and routes the traffic among MEC Apps 726, MEC services 736, DNS server/proxy (see e.g., via DNS handling entity 742), 3GPP network, local networks, and external networks. The MEC DP 724 may be connected with the (R)AN nodes and the 3GPP core network, and/or may be connected with an access point via a wider network, such as the internet, an enterprise network, or the like.

The MEC platform 732 is a collection of essential functionality required to run MEC Apps 726 on a particular VI 722 and enable them to provide and consume MEC services 736, and that can provide itself a number of MEC services 937a. The MEC platform 732 can also provide various services and/or functions, such as offering an environment where the MEC Apps 726 can discover, advertise, consume and offer MEC services 736 (discussed infra), including MEC services 736 available via other platforms when supported. The MEC platform 732 may be able to allow authorized MEC Apps 726 to communicate with third party servers located in external networks. The MEC platform 732 may receive traffic rules from the MEC platform manager 706, applications, or services, and instruct the data plane accordingly (see e.g., Traffic Rules Control 740). The MEC platform 732 may send instructions to the DP 724 within the VI 722 via the Mp2 reference point. The Mp2 reference point between the MEC platform 732 and the DP 724 of the VI 722 may be used to instruct the DP 734 on how to route traffic among applications, networks, services, etc. The MEC platform 732 may translate tokens representing UEs 720, UE apps, individual sessions, and/or individual flows within a session in the traffic rules into specific IP addresses. The MEC platform 732 also receives DNS records from the MEC platform manager 706 and configures a DNS proxy/ server accordingly. The MEC platform 732 hosts MEC services 736 including the multi-access edge services discussed infra, and provide access to persistent storage and time of day information. Furthermore, the MEC platform 732 may communicate with other MEC platforms 732 of other MEC servers 702 via the Mp3 reference point. Upon receipt of update, activation or deactivation of traffic rules from the MEC platform manager 706, apps, or services, the MEC platform 732 instructs the data plane 724 accordingly. The MEC platform 732 also receives DNS records from the MEC platform manager 706 and uses them to configure a DNS proxy/server 742. The traffic rules control 740 allows the MEC platform 732 to perform traffic routing including traffic rules update, activation, and deactivation. In some embodiments, the traffic rules control 740 allows the MEC platform 732 to perform traffic steering, for example, by directing data packets over one or more access network connections in a multi-access environment comprising multiple access networks, each of which may have multiple access network connections and/or may implement different access technologies.

The VI 722 represents the totality of all hardware and software components which build up the environment in which MEC Apps 726 and/or MEC platform 732 are deployed, managed and executed. The VI 722 may span across several locations, and the network providing connectivity between these locations is regarded to be part of the VI 722. The physical hardware resources of the VI 722 includes computing, storage and network resources that provide processing, storage and connectivity to MEC Apps 726 and/or MEC platform 732 through a virtualization layer (e.g., a hypervisor, VM monitor (VMM), or the like). The virtualization layer may abstract and/or logically partition the physical hardware resources of the MEC server 702 as a hardware abstraction layer. The virtualization layer may also enable the software that implements the MEC Apps 726 and/or MEC platform 732 to use the underlying VI 722, and may provide virtualized resources to the MEC Apps 726 and/or MEC platform 732, so that the MEC Apps 726 and/or MEC platform 732 can be executed.

The MEC Apps 726 are applications that can be instantiated on a MEC host/server 702 within the MEC system 700 and can potentially provide or consume MEC services 736. The term "MEC service" refers to a service provided via a MEC platform 732 either by the MEC platform 732 itself or by a MEC App 726. MEC Apps 726 may run as VM on top of the VI 722 provided by the MEC server 702, and can interact with the MEC platform 732 to consume and provide the MEC services 736. The Mp1 reference point between the MEC platform 732 and the MEC Apps 726 is used for consuming and providing service specific functionality. Mp1 provides service registration 738, service discovery, and communication support for various services, such as the MEC services 736 provided by MEC host 702. Mp1 may also provide application availability, session state relocation support procedures, traffic rules and DNS rules activation, access to persistent storage and time of day information, and/or the like. Additionally or alternatively, the MEC Apps 726 may communicate with the MEC platform 732 using the MEC APIs discussed in ETSI GS MEC 011 V2.1.1 (2019-11).

The MEC Apps 726 are instantiated on the VI 722 of the MEC server 702 based on configuration or requests validated by the MEC management (e.g., MEC platform manager 706). The MEC Apps 726 can also interact with the MEC platform 732 to perform certain support procedures related to the lifecycle of the MEC Apps 726, such as indicating availability, preparing relocation of user state, etc. The MEC Apps 726 may have a certain number of rules and requirements associated to them, such as required resources, maximum latency, required or useful services, etc. These requirements may be validated by the MEC management, and can be assigned to default values if missing. MEC services 736 are services provided and/or consumed either by the MEC platform 732 and/or MEC Apps 726. The service consumers (e.g., MEC Apps 726 and/or MEC platform 732) may communicate with particular MEC services 736 over individual APIs (including MEC V2X API and the other MEC APIs discussed herein). When provided by an application, a MEC service 736 can be registered in a list of services in the service registries 738 to the MEC platform 732 over the Mp1 reference point. Additionally, a MEC App 726 can subscribe to one or more services 730/736 for which it is authorized over the Mp1 reference point.

Examples of MEC services 736 include V2X information services (VIS), RNIS (see e.g., ETSI GS MEC 012 V1.1.1 (2017-07)), Location Services (see e.g., ETSI GS MEC 013 v1.1.1 (2017-07)), UE identity services (see e.g., ETSI GS MEC 014 V1.1.1 (2018-02)), BWMS (see e.g., ETSI GS MEC 015 V1.1.1 (2017-10)), WLAN Access Information (WAI) services, Fixed Access Information (FAI) services (see e.g., ETSI GS MEC 029 v2.1.1 (2019-07)), and/or other MEC services. The RNIS, when available, provides authorized MEC Apps 726 with radio network related information, and expose appropriate up-to-date radio network information to the MEC Apps 726. The RNI may include, inter alia, radio network conditions, measurement and statistics information related to the user plane, information related to UEs 720 served by the radio node(s) associated with the MEC host 702 (e.g., UE context and radio access bearers), changes on information related to UEs 720 served by the radio node(s) associated with the MEC host XE136, and/or the like. The RNI may be provided at the relevant granularity (e.g., per ULE 720, per cell, per period of time).

The service consumers (e.g., MEC Apps 726, MEC platform 732, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 732 (not shown). A MEC App 726 may query information on a message broker via a transport information query procedure, wherein the transport information may be pre-provisioned to the MEC App 726 via a suitable configuration mechanism. The various messages communicated via the RNI API may be in XML, JSON, Protobuf, or some other suitable format.

The VIS provides supports various V2X applications including the journey-aware QoS predictions according to the various embodiments discussed herein. The RNI may be used by MEC Apps 726 and MEC platform 732 to optimize the existing services and to provide new types of services that are based on up to date information on radio conditions. As an example, a MEC App 726 may use RNI to optimize current services such as video throughput guidance. In throughput guidance, a radio analytics MEC App 726 may use MEC services to provide a backend video server with a near real-time indication on the throughput estimated to be available at the radio DL interface in a next time instant. The throughput guidance radio analytics application computes throughput guidance based on the required radio network information it obtains from a multi-access edge service running on the MEC server 702. RNI may be also used by the MEC platform 732 to optimize the mobility procedures required to support service continuity, such as when a certain MEC App 726 requests a single piece of information using a simple request-response model (e.g., using RESTful mechanisms) while other MEC Apps 726 subscribe to multiple different notifications regarding information changes (e.g., using a pub/sub mechanism and/or message broker mechanisms).

The LS, when available, may provide authorized MEC Apps 726 with location-related information, and expose such information to the MEC Apps 726. With location related information, the MEC platform 732 or one or more MEC Apps 726 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 720 currently served by the radio node(s) associated with the MEC server 702, information about the location of all UEs 720 currently served by the radio node(s) associated with the MEC server XE136, information about the location of a certain category of UEs 720 currently served by the radio node(s) associated with the MEC server XE136, a list of UEs 720 in a particular location, information about the location of all radio nodes currently associated with the MEC host 702, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 702, or a subset thereof, according to a desired deployment. In this regard, the OMA Zonal Presence API provides means for MEC Apps 726 to retrieve information about a zone, the access points associated to the zones and the users that are connected to the access points. In addition, the OMA Zonal Presence API, allows authorized application to subscribe to a notification mechanism, reporting about user activities within a zone. A MEC server 702 may access location information or zonal presence information of individual UEs 720 using the OMA Zonal Presence API to identify the relative location or positions of the UEs 720.

The BWMS provides for the allocation of bandwidth to certain traffic routed to and from MEC Apps 726, and specify static/dynamic up/down bandwidth resources, including bandwidth size and bandwidth priority. MEC Apps 726 may use the BWMS to update/receive bandwidth information to/from the MEC platform 732. Different MEC Apps 726 running in parallel on the same MEC server 702 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

The purpose of the UE Identity feature is to allow UE specific traffic rules in the MEC system 700. When the MEC system 700 supports the UE Identity feature, the MEC platform 732 provides the functionality (e.g., UE Identity API) for a MEC App 726 to register a tag representing a UE 720 or a list of tags representing respective UEs 720. Each tag is mapped into a specific UE 720 in the MNO's system, and the MEC platform 732 is provided with the mapping information. The UE Identity tag registration triggers the MEC platform 732 to activate the corresponding traffic rule(s) 740 linked to the tag. The MEC platform 732 also provides the functionality (e.g., UE Identity API) for a MEC App 726 to invoke a de-registration procedure to disable or otherwise stop using the traffic rule for that user.

The WAIS is a service that provides WLAN access related information to service consumers within the MEC System 700. The WAIS is available for authorized MEC Apps 726 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 700. The FAIS is available for the authorized MEC Apps 726 and is discovered over the Mp1 reference point. The FAI may be used by MEC Apps 726 and the MEC platform 732 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 726 and the MEC platform 732 may consume the FAIS; and both the MEC platform 732 and the MEC Apps 726 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 706 and the VI manager (VIM) 708, and handles the management of MEC-specific functionality of a particular MEC server 702 and the applications running on it. In some implementations, some or all of the multi-access edge management components may be implemented by one or more servers located in one or more data centers, and may use virtualization infrastructure that is connected with NFV infrastructure used to virtualize NFs, or using the same hardware as the NFV infrastructure.

The MEC platform manager 706 is responsible for managing the life cycle of applications including informing the MEC orchestrator (MEC-O) 710 of relevant application related events. The MEC platform manager 706 may also provide MEC Platform Element management functions 744 to the MEC platform 732, manage MEC App rules and requirements 746 including service authorizations, traffic rules, DNS configuration and resolving conflicts, and manage MEC App lifecycles mgmt 748. The MEC platform manager 706 may also receive virtualized resources, fault reports, and performance measurements from the VIM 708 for further processing. The Mm5 reference point between the MEC platform manager 706 and the MEC platform 732 is used to perform platform configuration, configuration of the MEC Platform element mgmt 744, MEC App rules and reqts 746, MEC App lifecycles mgmt 748, and management of application relocation.

The VIM 708 may be an entity that allocates, manages and releases virtualized (compute, storage and networking) resources of the VI 722, and prepares the VI 722 to run a software image. To do so, the VIM 708 may communicate with the VI 722 over the Mm7 reference point between the VIM 708 and the VI 722. Preparing the VI 722 may include configuring the VI 722, and receiving/storing the software image. When supported, the VIM 708 may provide rapid provisioning of applications, such as described in "Openstack++ for Cloudlet Deployments", available at http://reports-archive.adm.cs.cmu.edu/anon/2015/CMU-CS-15-123.pdf. The VIM 708 may also collect and report performance and fault information about the virtualized resources, and perform application relocation when supported. For application relocation from/to external cloud environments, the VIM 708 may interact with an external cloud manager to perform the application relocation, for example using the mechanism described in "Adaptive VM Handoff Across Cloudlets", and/or possibly through a proxy. Furthermore, the VIM 708 may communicate with the MEC platform manager 706 via the Mm6 reference point, which may be used to manage virtualized resources, for example, to realize the application lifecycle management. Moreover, the VIM 708 may communicate with the MEC-O 710 via the Mm4 reference point, which may be used to manage virtualized resources of the MEC server 702, and to manage application images. Managing the virtualized resources may include tracking available resource capacity, etc.

The MEC system level management includes the MEC-O 710, which has an overview of the complete MEC system 700. The MEC-O 710 may maintain an overall view of the MEC system 700 based on deployed MEC hosts 702, available resources, available MEC services 736, and topology. The Mm3 reference point between the MEC-O 710 and the MEC platform manager 706 may be used for the management of the application lifecycle, application rules and requirements and keeping track of available MEC services 736. The MEC-O 710 may communicate with the user application lifecycle management proxy (UALMP) 714 via the Mm9 reference point in order to manage MEC Apps 726 requested by UE app 718.

The MEC-O 710 may also be responsible for on-boarding of application packages, including checking the integrity and authenticity of the packages, validating application rules and requirements and if necessary adjusting them to comply with operator policies, keeping a record of on-boarded packages, and preparing the VIM(s) 708 to handle the applications. The MEC-O 710 may select appropriate MEC host(s) 901 for application instantiation based on constraints, such as latency, available resources, and available services. The MEC-O 710 may also trigger application instantiation and termination, as well as trigger application relocation as needed and when supported.

The Operations Support System (OSS) 712 is the OSS of an operator that receives requests via the Customer Facing Service (CFS) portal 716 over the Mx1 reference point and from UE apps 718 for instantiation or termination of MEC Apps 726. The OSS 712 decides on the granting of these requests. The CFS portal 716 (and the Mx1 interface) may be used by third-parties to request the MEC system 700 to run apps 718 in the MEC system 700. Granted requests may be forwarded to the MEC-O 710 for further processing. When supported, the OSS 712 also receives requests from UE apps 718 for relocating applications between external clouds and the MEC system 700. The Mm2 reference point between the OSS 712 and the MEC platform manager 706 is used for the MEC platform manager 706 configuration, fault and performance management. The Mm1 reference point between the MEC-O 710 and the OSS 712 is used for triggering the instantiation and the termination of MEC Apps 726 in the MEC system 700.

The ULE app(s) 718 (also referred to as "device applications" or the like) is one or more apps running in a device 720 that has the capability to interact with the MEC system 700 via the user application lifecycle management proxy 714. The ULE app(s) 718 may be, include, or interact with one or more client applications, which in the context of MEC, is application software running on the device 718 that utilizes functionality provided by one or more specific MEC Apps 726. The user app LCM proxy 714 may authorize requests from UE apps 718 in the UE 720 and interacts with the OSS 712 and the MEC-O 710 for further processing of these requests. The term "lifecycle management," in the context of MEC, refers to a set of functions required to manage the instantiation, maintenance and termination of a MEC App 726 instance. The user app LCM proxy 714 may interact with the OSS 712 via the Mm8 reference point, and is used to handle UE 718 requests for running applications in the MEC system 700. A user app may be an MEC App 726 that is instantiated in the MEC system 700 in response to a request of a user via an application running in the UE 720 (e.g., UE App 718). The user app LCM proxy 714 allows UE apps 718 to request on-boarding, instantiation, termination of user applications and when supported, relocation of user applications in and out of the MEC system 700. It also allows informing the user apps about the state of the user apps. The user app LCM proxy 714 is only accessible from within the mobile network, and may only be available when supported by the MEC system 700. A UE app 718 may use the Mx2 reference point between the user app LCM proxy 714 and the UE app 718 to request the MEC system 700 to run an application in the MEC system 700, or to move an application in or out of the MEC system 700. The Mx2 reference point may only be accessible within the mobile network and may only be available when supported by the MEC system 700.

In order to run an MEC App 726 in the MEC system 700, the MEC-O 710 receives requests triggered by the OSS 712, a third-party, or a UE app 718. In response to receipt of such requests, the MEC-O 710 selects a MEC server/host 702 to host the MEC App 726 for computational offloading, etc. These requests may include information about the application to be run, and possibly other information, such as the location where the application needs to be active, other application rules and requirements, as well as the location of the application image if it is not yet on-boarded in the MEC system 700.

The MEC-O 710 may select one or more MEC servers 702 for computational intensive tasks. The selected one or more MEC servers XE136 may offload computational tasks of a UE app 718 based on various operational parameters, such as network capabilities and conditions, computational capabilities and conditions, application requirements, and/or other like operational parameters. The application requirements may be rules and requirements associated to/with one or more MEC Apps 726, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 726 to be able to run; multi-access edge services that the MEC Apps 726 can take advantage of, if available; connectivity or mobility support/requirements (e.g., application state relocation, application instance relocation); required multi-access edge features, such as VM relocation support or ULE identity; required network connectivity (e.g., connectivity to applications within the MEC system 700, connectivity to local networks, or to the Internet); information on the operator's MEC system 700 deployment or mobile network deployment (e.g., topology, cost); requirements on access to user traffic; requirements on persistent storage; traffic rules 740; DNS rules 742; etc.

The MEC-O 710 considers the requirements and information listed above and information on the resources currently available in the MEC system 700 to select one or several MEC servers 702 to host MEC Apps 726 and/or for computational offloading. After one or more MEC servers XE136 are selected, the MEC-O 710 requests the selected MEC host(s) 702 to instantiate the application(s) or application tasks. The actual algorithm used to select the MEC servers 702 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 710 may decide to select one or more new MEC hosts 702 to act as a master node, and initiates the transfer of an application instance or application-related state information from the one or more source MEC hosts 702 to the one or more target MEC hosts 702.

In a first implementation, the UPF of the 5G system is mapped into the MEC architecture 700 as the MEC data plane 724. In these implementations, the UPF handles the user plane path of PDU sessions. Additionally, UPF provides the interface to a data network (e.g., DNs) and supports the functionality of a PDU session anchor.

In a second implementation, the AF of the 5G system is mapped into the MEC architecture 700 as the MEC platform 732. In these implementations, the AF is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN, MEC apps 726, 727, and/or 728 can be mapped in or to one or more DNs of a 5G system.

In a third implementation, a Radio Access Network (RAN) of 5GS (e.g., NG-RAN) can be a virtual RAN based on a VNF, and the UPF is configurable or operable to function as the MEC data plane 724 within an NF virtualization infrastructure (NFVI) (e.g., VI 722). In these implementations, the AF can be configured as MEC platform VNF, with MEC APIs, MEC application enablement functionality, and API principles functionality. Additionally, the local DN can include MEC apps 726, 727, and/or 728 instantiated as VNFs. This implementation can be configured to provide functionalities in accordance with the [M03] and/or ETSI GR MEC 017 V1.1.1 (2018-02). The third implementation may be combined with the first implementation and/or the second implementation, or may be a standalone implementation.

Additionally or alternatively, the access level edge can use one or more APIs to communicate with local/regional level edge networks. The local/regional level edge networks can include network nodes using corresponding applications to communicate with a national level edge network. The national level edge can include various NANs that use applications for accessing one or more remote clouds within the global level edge. The NANs are also configurable or operable for vertical segment management and SLA compliance. Additionally or alternatively, MEC deployment can be based on the definition of "edge" to provide degrees of freedom to MNOs, especially when deploying MEC in an NFV environment (e.g., MEC entities can be instantiated as Virtualized NFs (VNFs), thus with high flexibility in terms of deployment for the operator).

In some embodiments, MEC system 700 can be flexibly deployed depending on the use case/vertical segment/information to be processed. Some components of the MEC system 700 can be co-located with other elements of the system. As an example, in certain use cases (e.g., enterprise), a MEC app 726 may need to consume a MEC service locally, and it may be efficient to deploy a MEC host locally equipped with the needed set of APIs. In another example, deploying a MEC server 702 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, in order to set up transport networks (e.g., for CDN-based services).

III.C. Hardware Components

Figure 8A:
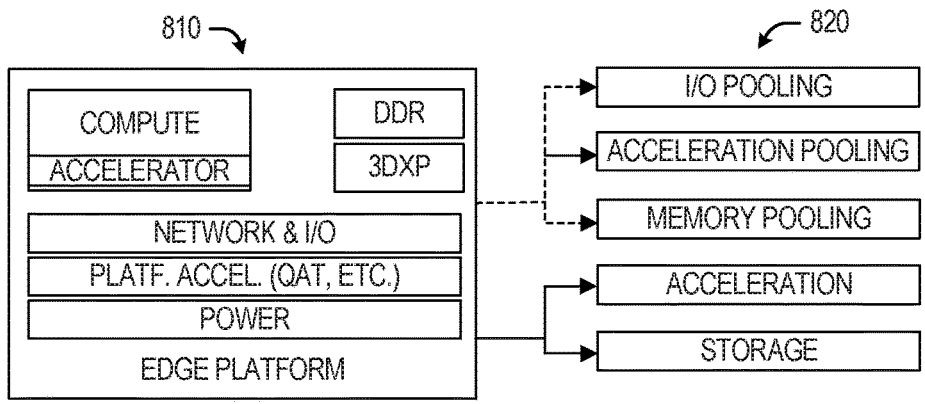
FIGS. 8A, 8B, and 8C depict examples of edge computing hardware configurations.

FIG. 8A illustrates a first edge computing hardware configuration, which maps various architectural aspects of an edge platform 810 (e.g., compute hardware, network features, power management features, etc.) to specific edge platform capabilities 820 (e.g., I/O pooling, acceleration pooling, memory pooling, acceleration technologies, storage capabilities). To offer the edge configuration as an overall solution for services, then the workloads or basic hardware components for services and service requirements/constraints (e.g., network and I/O, platform acceleration, power) are considered in light of available architectural aspects (e.g., pooling, storage, etc.). In some implementations, the edge platform 810 may be the same or similar as the platform 100 of FIG. 1.

Within the edge platform capabilities 820, specific acceleration types may be configured or identified in order to ensure service density is satisfied across the edge cloud. Specifically, four primary acceleration types may be deployed in an edge cloud configuration: (1) General Acceleration (e.g., FPGAs) to implement basic blocks such as a Fast Fourier transform (FFT), k-nearest neighbors algorithm (KNN) and machine learning workloads; (2) Image, Video and transcoding accelerators; (3) Inferencing accelerators; (4) Crypto and compression related workloads (implemented such as in Intel® QuickAssist™ technology). Thus, the particular design or configuration of the edge platform capabilities 820 can consider which is the right type of acceleration and platform product models that needs to be selected in order to accommodate the service and throughput density as well as available power.

Figure 8B:
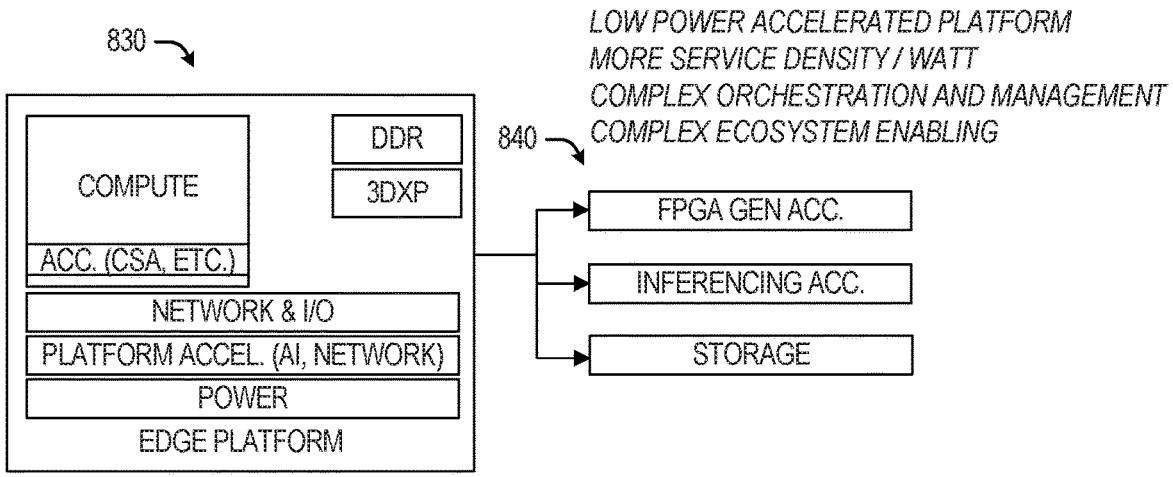

FIG. 8B illustrates a second edge computing hardware configuration, offering a second edge platform 830 with a second set of edge platform capabilities 840. This configuration may be deployable as a low power but more service-dense solution. This approach is targeted to define a lower power solution which uses acceleration schemes in order to achieve better service density or service throughput per watt. This main design trade-off leads to a platform that uses sacrifices general compute in favor specialized hardware (e.g., FPGAs, inferencing accelerators) that can perform the same work at better performance-per-watt ratio. In this example, a "service dense" solution enables more service actions per platform and per watt or being able to drive more throughput at a service level per watt. In some implementations, the edge platform 830 may be the same or similar as the platform 100 of FIG. 1.

The platform capabilities 840 may be designed to be favorable in terms of power envelope as well in terms of physical space. As a result, the configuration of FIG. 8B may provide a suitable target for base station deployments. However, the platform capabilities 840 may have tradeoffs including: (1) requirements in terms of orchestration, maintenance and system management (which can be translated to OPEX/TCO costs); (2) requiring an operator ecosystem to enable all a system stack to work with different accelerators that are exposed. However, these disadvantages may be mitigated with a developed software abstraction layer.

Figure 8C:
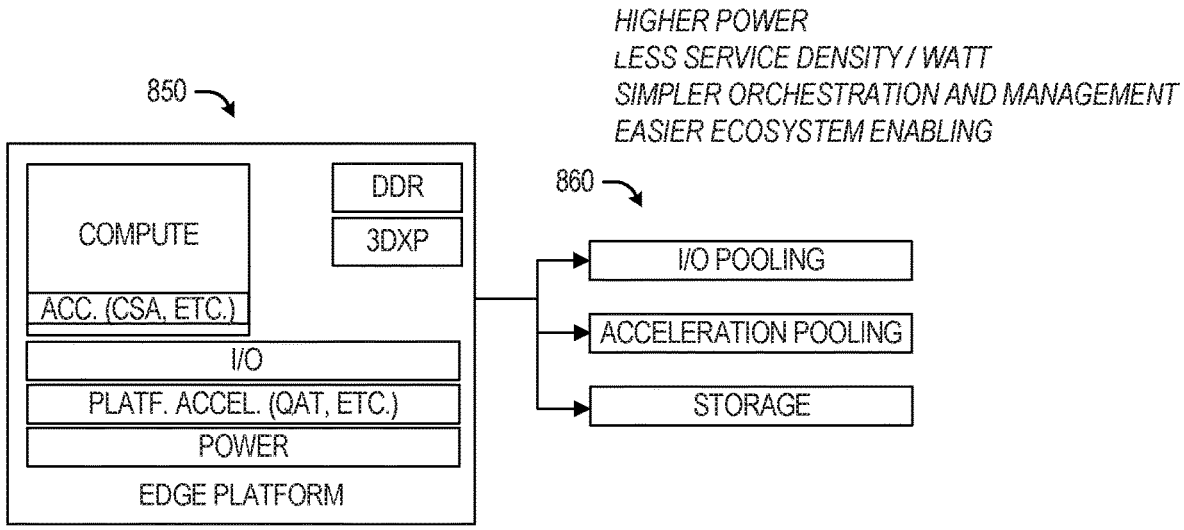

FIG. 8C illustrates a third edge computing hardware configuration, offering a third edge platform 850 with a second set of edge platform capabilities 860. This configuration offers a high power yet homogenous and generic architecture. FIG. 8C provides an approach that is opposite as compared FIG. 8B, to provide a platform architecture with reduced heterogeneity in the different types of resources that an operator or edge owner has to deal with respect to management, maintenance and orchestration. However, removing accelerators in favor of homogeneity comes at a cost of having less service density and service throughput per watt at platform level. In further examples, the edge platform capabilities 860 may implement general purpose acceleration (such as in the form of FPGAs). In some implementations, the edge platform 850 may be the same or similar as the platform 100 of FIG. 1.

Other derivative functions of the edge platforms depicted in FIGS. 8A-C may also be adapted. For example, the platform can be sized and designed in order to incorporate new ingredients that make it more service and throughput dense but keeping it more homogenous by for example including accelerators inside the platform or on die in order to make them seamlessly manageable to the operators.

Figure 9:
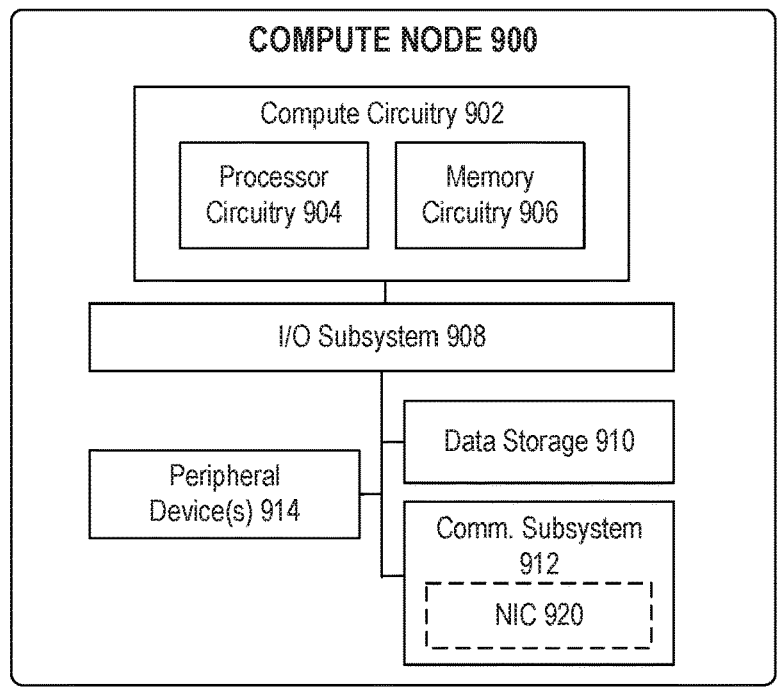
FIGS. 9 and 10 depict example components of various compute nodes in edge computing system(s).
Figure 10:
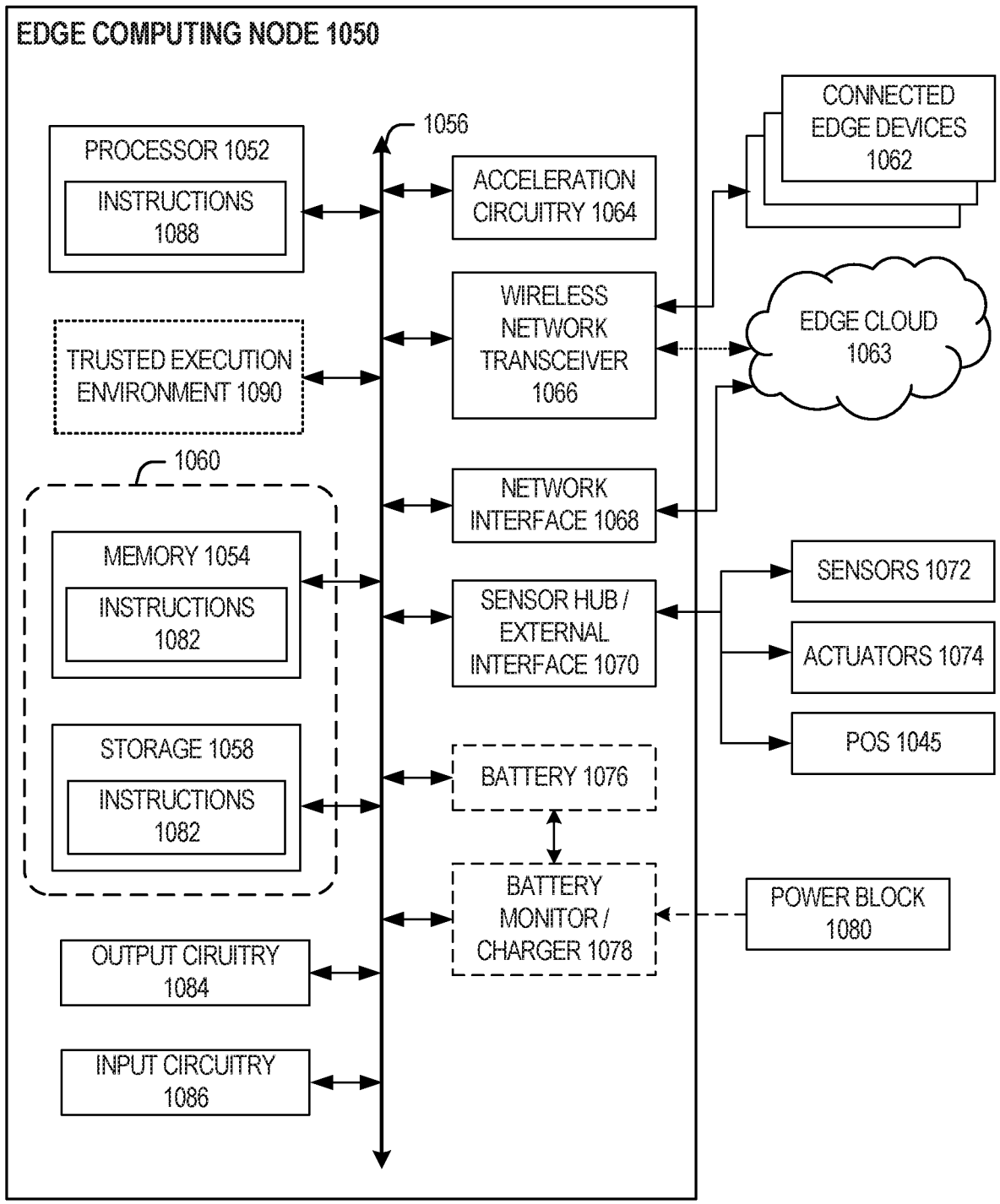

FIGS. 9 and 10 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 9, an edge compute node 900 includes a compute engine (also referred to herein as "compute circuitry") 902, an input/output (I/O) subsystem 908, data storage 910, a communication circuitry subsystem 912, and, optionally, one or more peripheral devices 914. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 900 may be embodied as any type of engine, device, or collection of devices capable of performing various compute functions. In some examples, the compute node 900 may be embodied as a single device such as an integrated circuit, an embedded system, an FPGA, a System-on-Chip (SoC), or other integrated system or device. The compute node 900 includes compute circuitry 902, which includes or is embodied as a processor 904 and a memory 906. In some implementations, the compute circuitry 902 may be, or may be part of, the platform 100 of FIG. 1, where the processor 904 may correspond to the host processor 102 and the memory 906 corresponds to the system memory 130. Although not shown by FIG. 9, other elements of platform 100 may also be included.

The processor 904 may be embodied as any type of processor capable of performing the functions described herein (e.g., executing an application). For example, the processor 904 may be embodied as a multi-core processor(s), a microcontroller, or other processor or processing/controlling circuit. In some examples, the processor 904 may be embodied as, include, or be coupled to a CPLD, FPGA, ASIC, (re)configurable hardware or hardware circuitry, or other specialized hardware to facilitate performance of the functions described herein.

The main memory 906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 906 may be integrated into the processor 904. The main memory 906 may store various software and data used during operation such as one or more applications, data operated on by the application(s), libraries, and drivers.

The compute circuitry 902 is communicatively coupled to other components of the compute node 900 via the I/O subsystem 908, which may be embodied as circuitry and/or components to facilitate input/output operations with the compute circuitry 902 (e.g., with the processor 904 and/or the main memory 906) and other components of the compute circuitry 902. For example, the I/O subsystem 908 may be embodied as, or otherwise include, memory controller hubs, input/output control hubs, integrated sensor hubs (e.g., PCHs), firmware devices, communication links (e.g., point-to-point links, bus links, wires, cables, light guides, printed circuit board traces, etc.), and/or other components and subsystems to facilitate the input/output operations. In some examples, the I/O subsystem 908 may form a portion of a system-on-a-chip (SoC) and be incorporated, along with one or more of the processor 904, the main memory 906, and other components of the compute circuitry 902, into the compute circuitry 902.

The one or more illustrative data storage devices 910 may be embodied as any type of devices configured for short-term or long-term storage of data such as, for example, memory devices and circuits, memory cards, hard disk drives, solid-state drives, or other data storage devices. Individual data storage devices 910 may include a system partition that stores data and firmware code for the data storage device 910. Individual data storage devices 910 may also include one or more operating system partitions that store data files and executables for operating systems depending on, for example, the type of compute node 900.

The communication circuitry 912 may be embodied as any communication circuit, device, or collection thereof, capable of enabling communications over a network between the compute circuitry 902 and another compute device (e.g., an edge gateway node or the like). The communication circuitry 912 may be configured to use any one or more communication technology (e.g., wired or wireless communications) and associated protocols (e.g., a cellular networking protocol such a 3GPP 4G or 5G standard, a wireless local area network protocol such as IEEE 802.11/WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 912 includes a network interface controller (NIC) 920, which may also be referred to as a host fabric interface (HFI). The NIC 920 may be embodied as one or more add-in-boards, daughter cards, network interface cards, controller chips, chipsets, or other devices that may be used by the compute node 900 to connect with another compute device. In some examples, the NIC 920 may be embodied as part of a system-on-a-chip (SoC) that includes one or more processors, or included on a multichip package that also contains one or more processors. In some examples, the NIC 920 may include a local processor (not shown) and/or a local memory (not shown) that are both local to the NIC 920. In such examples, the local processor of the NIC 920 may be capable of performing one or more of the functions of the compute circuitry 902 described herein. Additionally, or alternatively, in such examples, the local memory of the NIC 920 may be integrated into one or more components of the client compute node at the board level, socket level, chip level, and/or other levels.

Additionally, in some examples, a respective compute node 900 may include one or more peripheral devices 914. Such peripheral devices 914 may include any type of peripheral device found in a compute device or server such as audio input devices, a display, other input/output devices, interface devices, and/or other peripheral devices, depending on the particular type of the compute node 900. In further examples, the compute node 900 may be embodied by a respective edge compute node in an edge computing system (e.g., client compute node, edge gateway node, edge aggregation node, ULEs discussed previous, etc.) or like forms of appliances, computers, subsystems, circuitry, or other components.

FIG. 10 illustrates an example of components that may be present in an edge computing node 1050 for implementing the techniques (e.g., operations, processes, methods, and methodologies) described herein. This edge computing node 1050 provides a closer view of the respective components of node 1000 when implemented as or as part of a computing device (e.g., as a mobile device, a base station, server, gateway, etc.). The edge computing node 1050 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1050, or as components otherwise incorporated within a chassis of a larger system. In some implementations, some of the elements of edge computing node 1050 may be part of the platform 100 of FIG. 1. For example, the processor circuitry 1052 may correspond to the host processor 102, the memory circuitry 1054 may correspond to the system memory 130, the sensor hub/external interface 1070 may correspond to the PCH 115, and the PSE 112 may be or may be coupled to the battery 1076 and/or battery monitor 1078. Although not shown by FIG. 10, other elements of platform 100 may also be included.

The edge computing node 1050 includes processing circuitry in the form of one or more processors 1052. The processor circuitry 1052 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watch-dog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1052 may include one or more hardware accelerators (e.g., same or similar to acceleration circuitry 1064), which may be microprocessors, programmable processing devices (e.g., FPGA, ASIC, etc.), or the like. The one or more accelerators may include, for example, computer vision and/or deep learning accelerators. In some implementations, the processor circuitry 1052 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1052 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1052 may be coupled with or may include memory/storage and may be configured to execute instructions stored in the memory/storage to enable various applications or operating systems to run on the node 1050. The processors (or cores) 1052 is configured to operate application software to provide a specific service to a user of the node 1050. In some embodiments, the processor(s) 1052 may be a special-purpose processor(s)/controller(s) configured (or configurable) to operate according to the various embodiments herein.

As examples, the processor(s) 1052 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1052 may be a part of a system on a chip (SoC), System-in-Package (SiP), a multi-chip package (MCP), and/or the like, in which the processor(s) 1052 and other components are formed into a single integrated circuit, or a single package, such as the Edison™ or Galileo™ SoC boards from Intel® Corporation. Other examples of the processor(s) 1052 are mentioned elsewhere in the present disclosure.

The processor(s) 1052 may communicate with system memory 1054 over an interconnect (IX) 1056. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIM Ms or MiniDIMMs.

To provide for persistent storage of information such as data, applications, operating systems and so forth, a storage 1058 may also couple to the processor 1052 via the IX 1056. In an example, the storage 1058 may be implemented via a solid-state disk drive (SSDD) and/or high-speed electrically erasable memory (commonly referred to as "flash memory"). Other devices that may be used for the storage 1058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1054 and/or storage circuitry 1058 may also incorporate three-dimensional (3D) cross-point (XPOINT) memories from Intel® and Micron®.

In low power implementations, the storage 1058 may be on-die memory or registers associated with the processor 1052. However, in some examples, the storage 958 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The storage circuitry 1058 store computational logic 1082 (or "modules 1082") in the form of software, firmware, or hardware commands to implement the techniques described herein. The computational logic 1082 may be employed to store working copies and/or permanent copies of computer programs, or data to create the computer programs, for the operation of various components of node 1050 (e.g., drivers, etc.), an OS of node 1050 and/or one or more applications for carrying out the embodiments discussed herein. The computational logic 1082 may be stored or loaded into memory circuitry 1054 as instructions 1082, or data to create the instructions 1088, for execution by the processor circuitry 1052 to provide the functions described herein. The various elements may be implemented by assembler instructions supported by processor circuitry 1052 or high-level languages that may be compiled into such instructions (e.g., instructions 1088, or data to create the instructions 1088). The permanent copy of the programming instructions may be placed into persistent storage devices of storage circuitry 1058 in the factory or in the field through, for example, a distribution medium (not shown), through a communication interface (e.g., from a distribution server (not shown)), or over-the-air (OTA).

In an example, the instructions 1088 provided via the memory circuitry 1054 and/or the storage circuitry 1058 of FIG. 10 are embodied as one or more non-transitory computer readable storage media (see e.g., NTCRSM 1060) including program code, a computer program product or data to create the computer program, with the computer program or data, to direct the processor circuitry 1058 of node 1050 to perform electronic operations in the node 1050, and/or to perform a specific sequence or flow of actions, for example, as described with respect to the flowchart(s) and block diagram(s) of operations and functionality depicted previously. The processor circuitry 1052 accesses the one or more non-transitory computer readable storage media over the interconnect 1056.

In alternate embodiments, programming instructions (or data to create the instructions) may be disposed on multiple NTCRSM 1060. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1060 may be embodied by devices described for the storage circuitry 1058 and/or memory circuitry 1054. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1082, instructions 1082, instructions 1088 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PUP, Pearl, Python, Ruby on Rails, Accelerated Mobile Pages Script (AMPscript), Mustache Template Language, Handlebars Template Language, Guide Template Language (GTL), PUP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1050, partly on the system 1050, as a stand-alone software package, partly on the system 1050 and partly on a remote computer or entirely on the remote computer or server. In the latter scenario, the remote computer may be connected to the system 1050 through any type of network, including a LAN or WAN, or the connection may be made to an external computer (e.g., through the Internet using an Internet Service Provider).

In an example, the instructions 1088 on the processor circuitry 1052 (separately, or in combination with the instructions 1082 and/or logic/modules 1082 stored in computer-readable storage media) may configure execution or operation of a trusted execution environment (TEE) 1090. The TEE 1090 operates as a protected area accessible to the processor circuitry 1052 to enable secure access to data and secure execution of instructions. In some embodiments, the TEE 1090 may be a physical hardware device that is separate from other components of the system 1050 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 1090 may be implemented as secure enclaves, which are isolated regions of code and/or data within the processor and/or memory/storage circuitry of the system 1050. Only code executed within a secure enclave may access data within the same secure enclave, and the secure enclave may only be accessible using the secure application (which may be implemented by an application processor or a tamper-resistant microcontroller). Various implementations of the TEE 1050, and an accompanying secure area in the processor circuitry 1052 or the memory circuitry 1054 and/or storage circuitry 1058 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1050 through the TEE 1090 and the processor circuitry 1052.

In some embodiments, the memory circuitry 1054 and/or storage circuitry 1058 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1054 and/or storage circuitry 1058 may be divided into one or more trusted memory regions for storing applications or software modules of the TEE 1090.

Although the instructions 1082 are shown as code blocks included in the memory circuitry 1054 and the computational logic 1082 is shown as code blocks in the storage circuitry 1058, it should be understood that any of the code blocks may be replaced with hardwired circuits, for example, built into an FPGA, ASIC, or some other suitable circuitry. For example, where processor circuitry 1052 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1054 and/or storage circuitry 1058 may store program code of an operating system (OS), which may be a general purpose OS or an OS specifically written for and tailored to the computing node 1050. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "pC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the node 1050, attached to the node 1050, or otherwise communicatively coupled with the node 1050. The drivers may include individual drivers allowing other components of the node 1050 to interact or control various I/O devices that may be present within, or connected to, the node 1050. For example, the drivers may include a display driver to control and allow access to a display device, a touchscreen driver to control and allow access to a touchscreen interface of the node 1050, sensor drivers to obtain sensor readings of sensor circuitry 1072 and control and allow access to sensor circuitry 1072, actuator drivers to obtain actuator positions of the actuators 1074 and/or control and allow access to the actuators 1074, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the node 1050 (not shown).

The components of edge computing device 1050 may communicate over the IX 1056. The IX 1056 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 1056 may be a proprietary bus, for example, used in a SoC based system.

The IX 1056 couples the processor 1052 to communication circuitry 1066 for communications with other devices, such as a remote server (not shown) and/or the connected edge devices 1062. The communication circuitry 1066 is a hardware element, or collection of hardware elements, used to communicate over one or more networks (e.g., cloud 1063) and/or with other devices (e.g., edge devices 1062).

The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement WiFi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the edge computing node 1050 may communicate with close devices, e.g., within about 10 meters, using a local transceiver based on BLE, or another low power radio, to save power. More distant connected edge devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in the edge cloud 1063 via local or wide area network protocols. The wireless network transceiver 1066 may be an LPWA transceiver that follows the IEEE 802.15.4, or IEEE 802.15.4g standards, among others. The edge computing node 1063 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as WiFi® networks for medium speed communications and provision of network communications. The transceiver 1066 may include radios that are compatible with any number of 3GPP specifications, such as LTE and 5G/NR communication systems, discussed in further detail at the end of the present disclosure. A network interface controller (NIC) 1068 may be included to provide a wired communication to nodes of the edge cloud 1063 or to other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 10968, or 1070. Accordingly, in various examples, applicable means for communicating (e.g., receiving, transmitting, etc.) may be embodied by such communications circuitry.

The edge computing node 1050 may include or be coupled to acceleration circuitry 1064, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1064 may comprise logic blocks or logic fabric and other interconnected resources that may be programmed (configured) to perform various functions, such as the procedures, methods, functions, etc. of the various embodiments discussed herein. In such implementations, the acceleration circuitry 1064 may also include memory cells (e.g., EPROM, EEPROM, flash memory, static memory (e.g., SRAM, anti-fuses, etc.) used to store logic blocks, logic fabric, data, etc. in LUTs and the like.

The IX 1056 also couples the processor 1052 to a sensor hub or external interface 1070 that is used to connect additional devices or subsystems. The additional/external devices may include sensors 1072, actuators 1074, and positioning circuitry 1045.

The sensor circuitry 1072 includes devices, modules, or subsystems whose purpose is to detect events or changes in its environment and send the information (sensor data) about the detected events to some other a device, module, subsystem, etc. Examples of such sensors 1072 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1074, allow node 1050 to change its state, position, and/or orientation, or move or control a mechanism or system. The actuators 1074 comprise electrical and/or mechanical devices for moving or controlling a mechanism or system, and converts energy (e.g., electric current or moving air and/or liquid) into some kind of motion. The actuators 1074 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1074 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The node 1050 may be configured to operate one or more actuators 1074 based on one or more captured events and/or instructions or control signals received from a service provider and/or various client systems The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the communication circuitry 1066 to communicate with the nodes and components of the positioning network. The positioning circuitry 1045 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1045 is, or includes an INS, which is a system or device that uses sensor circuitry 1072 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 1050 without the need for external references.

In some optional examples, various input/output (I/O) devices may be present within or connected to, the edge computing node 1050, which are referred to as input circuitry 1086 and output circuitry 1084 in FIG. 10. The input circuitry 10986 and output circuitry 1084 include one or more user interfaces designed to enable user interaction with the node 1050 and/or peripheral component interfaces designed to enable peripheral component interaction with the node 1050. Input circuitry 1086 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1084 may be included to show information or otherwise convey information, such as sensor readings, actuator position(s), or other like information. Data and/or graphics may be displayed on one or more user interface components of the output circuitry 1084. Output circuitry 1084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the node 1050. The output circuitry 1084 may also include speakers or other audio emitting devices, printer(s), and/or the like. In some embodiments, the sensor circuitry 1072 may be used as the input circuitry 1084 (e.g., an image capture device, motion capture device, or the like) and one or more actuators 1074 may be used as the output device circuitry 1084 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1076 may power the edge computing node 1050, although, in examples in which the edge computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the edge computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the IX 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the edge computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 982 provided via the memory 1054, the storage 1058, or the processor 1052 may be embodied as a non-transitory, machine-readable medium 1060 including code to direct the processor 1052 to perform electronic operations in the edge computing node 1050. The processor 1052 may access the non-transitory, machine-readable medium 1060 over the IX 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 11:
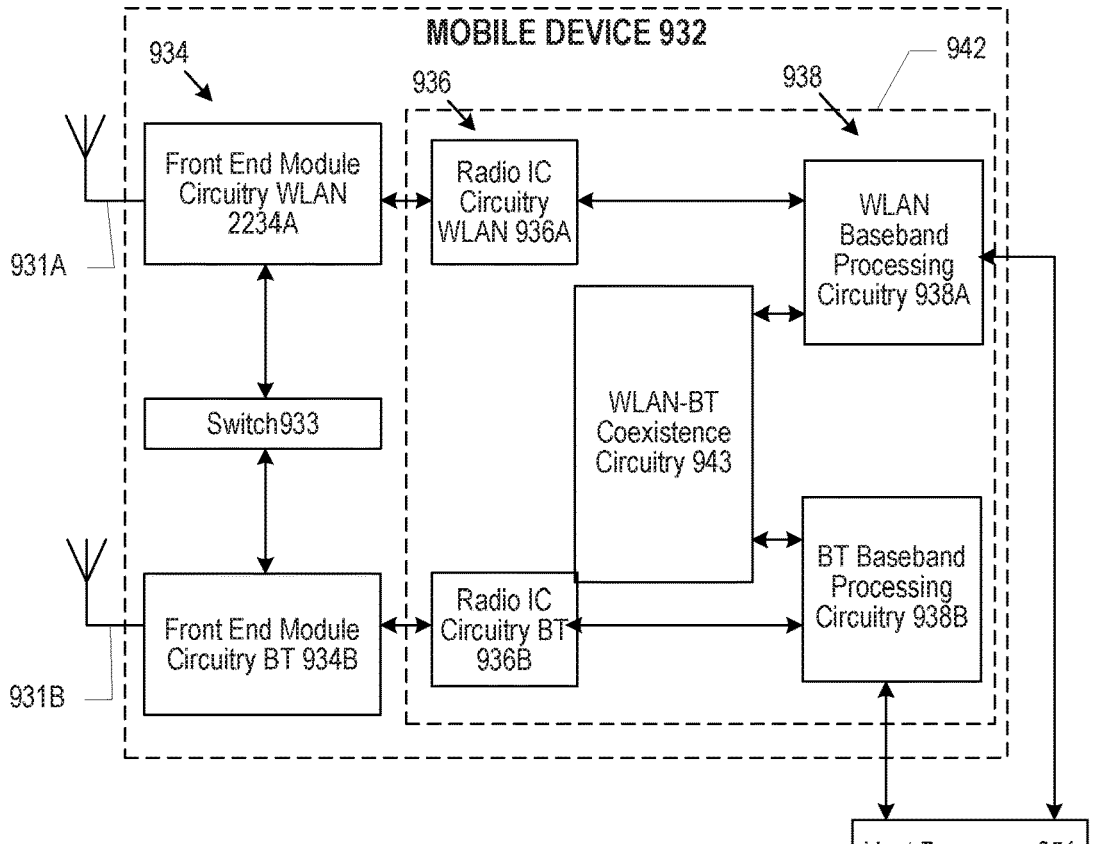
FIG. 11 depicts an example mobile computing device in an edge computing system.

FIG. 11 depicts communication components within an example mobile device 932. This mobile device 932 provides a closer view of the communication processing components of node 900 or device 950 when implemented as a user equipment or a component of a user equipment.

The mobile device 932 may include radio front-end module (FEM) circuitry 934, radio IC circuitry 936 and baseband processing circuitry 938. The mobile device 932 as shown includes both Wireless Local Area Network (WLAN) functionality and Bluetooth (BT) functionality although aspects of the device are not so limited, and other radio technologies discussed herein may be implemented by similar circuitry. FEM circuitry 934 may include, for example, a WLAN or WiFi FEM circuitry 934A and a Bluetooth (BT) FEM circuitry 934B. The WLAN FEM circuitry 934A may include a receive signal path comprising circuitry configured to operate on WLAN RF signals received from one or more antennas 931A, to amplify the received signals and to provide the amplified versions of the received signals to the WLAN radio IC circuitry 936A for further processing. The BT FEM circuitry 934B may include a receive signal path which may include circuitry configured to operate on BT RF signals received from one or more antennas 931B, to amplify the received signals and to provide the amplified versions of the received signals to the BT radio IC circuitry 936B for further processing. FEM circuitry 934A may also include a transmit signal path which may include circuitry configured to amplify WLAN signals provided by the radio IC circuitry 936A for wireless transmission by one or more of the antennas 931A. In addition, FEM circuitry 934B may also include a transmit signal path which may include circuitry configured to amplify BT signals provided by the radio IC circuitry 936B for wireless transmission by the one or more antennas 931B. In the example of FIG. 11, although FEM 934A and FEM 934B are shown as being distinct from one another, aspects of the present disclosure are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 936 as shown may include WLAN radio IC circuitry 936A and BT radio IC circuitry 936B. The WLAN radio IC circuitry 936A may include a receive signal path which may include circuitry to down-convert WLAN RF signals received from the FEM circuitry 934A and provide baseband signals to WLAN baseband processing circuitry 938A. BT radio IC circuitry 936B may in turn include a receive signal path which may include circuitry to down-convert BT RF signals received from the FEM circuitry 934B and provide baseband signals to BT baseband processing circuitry 938B. WLAN radio IC circuitry 936A may also include a transmit signal path which may include circuitry to up-convert WLAN baseband signals provided by the WLAN baseband processing circuitry 938A and provide WLAN RF output signals to the FEM circuitry 934A for subsequent wireless transmission by the one or more antennas 931A. BT radio IC circuitry 936B may also include a transmit signal path which may include circuitry to up-convert BT baseband signals provided by the BT baseband processing circuitry 938B and provide BT RF output signals to the FEM circuitry 934B for subsequent wireless transmission by the one or more antennas 931B. In the example of FIG. 11, although radio IC circuitries 936A and 936B are shown as being distinct from one another, aspects of the present disclosure are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 938 may include a WLAN baseband processing circuitry 938A and a BT baseband processing circuitry 938B. The WLAN baseband processing circuitry 938A may include a memory, such as, for example, a set of RAM arrays in a Fast Fourier Transform or Inverse Fast Fourier Transform block (not shown) of the WLAN baseband processing circuitry 938A. Each of the WLAN baseband circuitry 938A and the BT baseband circuitry 938B may further include one or more processors and control logic to process the signals received from the corresponding WLAN or BT receive signal path of the radio IC circuitry 936, and to also generate corresponding WLAN or BT baseband signals for the transmit signal path of the radio IC circuitry 936. Each of the baseband processing circuitries 938A and 938B may further include physical layer (PHY) and medium access control layer (MAC) circuitry, and may further interface with host processor 951 for generation and processing of the baseband signals and for controlling operations of the radio IC circuitry 936. The host processor 951 may be the same or similar to host processor 102 of FIG. 1 processor circuitry 1052 of FIG. 10.

Referring still to FIG. 11, according to the illustrated aspects, WLAN-BT coexistence circuitry 943 may include logic providing an interface between the WLAN baseband circuitry 938A and the BT baseband circuitry 938B to enable use cases requiring WLAN and BT coexistence. In addition, a switch 933 may be provided between the WLAN FEM circuitry 934A and the BT FEM circuitry 934B to allow switching between the WLAN and BT radios according to application needs. In addition, although the antennas 931A, 931B are depicted as being respectively connected to the WLAN FEM circuitry 934A and the BT FEM circuitry 934B, aspects of the present disclosure include within their scope the sharing of one or more antennas as between the WLAN and BT FEMs, or the provision of more than one antenna connected to each of FEM 934A or 934B.

In some aspects of the present disclosure, the front-end module circuitry 934, the radio IC circuitry 936, and baseband processing circuitry 938 may be provided on a single radio card. In other aspects, the one or more antennas 931A, 931B, the FEM circuitry 934 and the radio IC circuitry 936 may be provided on a single radio card. In some other aspects of the present disclosure, the radio IC circuitry 936 and the baseband processing circuitry 938 may be provided on a single chip or integrated circuit (IC).

Figure 12:
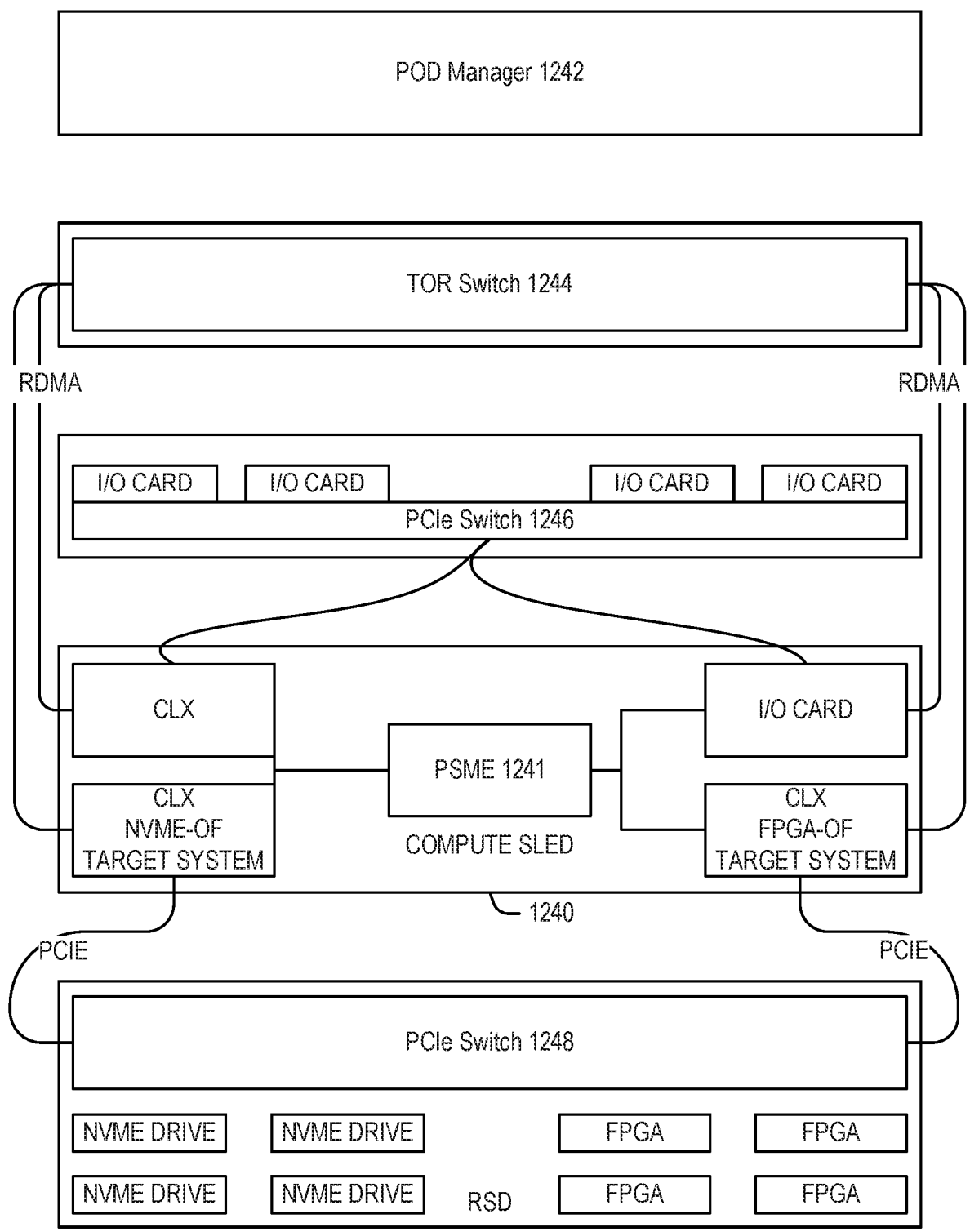
FIG. 12 depicts an example of a configurable server rack in an edge computing system.

FIG. 12 illustrates Rack Scale Design (RSD) components that may be included a part of a server or other discrete compute node in an edge platform architecture. This arrangement provides a closer view of the configurable processing components of node 900 or device 1050 when implemented as a server (e.g., in a server rack, blade, etc.). This configurable architecture differs from some others by disaggregating field programmable gate array (FPGA), non-volatile memory express (NVMe), and input/output (I/O) pooling resources. The FPGA and NVMe resources provide elements that may be used for any type of edge services, such as video or speech analytics. I/O pooling may be used to provide flexible NFs. This architecture enables scaling network interfaces according to the expected data rate or network load for a particular VNF. This architecture also enables flexibility to map different network cards to compute nodes depending on the type of network processing happening at a given node.

The illustrated RSD architecture includes a point of delivery (POD) Manager 1242. The POD Manager 1242 is responsible of managing the resources-including compute and disaggregated resources—within a POD (e.g., one or more racks). The POD Manager 1242 exposes interfaces to an orchestrator in order to create, manage, or destroy composed nodes. Managing a composed node includes the feature of scaling up or down the amount of pooled resources 1248 connected to a particular compute sled 1240.

The POD Manager 1242 typically runs on a node controller. The POD Manager 1242 is responsible for discovery of resources in the POD, configuring and managing the resources, and composing a logical server. In an example, the POD Manager 1242 is an optional separate component and will not be required in-rack. However, in an example, to be "RSD conformant" a Rack is manageable by a certified POD Manager.

The following are some example attributes of a POD Manager 1242. For example, a rack may include a set of compute sleds 1240 used to execute edge services and other related system software stacks (e.g., such as orchestration or other system services). One type of compute sled 1240 may be a Pooled Resources Sled. This compute sled 1240 may manage a set of disaggregated resources. Here, a compute sled 940 may include a pooled System Management Engine software (PSME) 1241. The PSME 1241 provides a management interface to manage the modules or blades at a drawer level. In an example, a rack contains one or more logical PSME(s). For example, each drawer may have a PSME or server drawers may share a PSME, or a PSME may run on a top-of-rack (TOR) 1244 switch or on a separate host. In an example, the PSME 1241 supports the RSD APIs.

In an example, the compute sled 1240 may include processors (e.g., CLX) to run an RSD software stack implementing NVM-oF or FPGA-oF acting as a target system and managing a set of disaggregated resources. In an example, the processors are connected using PCIe x16 bifurcation port to a PCIe switch 1246 providing access to the target resources (FPGA or NVME in the RSD 1248). Various RSD edge-composed node flavors may be used in the compute sled 1240 to run edge services. Services running on those nodes may use client software libraries or drivers to provide transparent access to the disaggregated FPGAS and NVME in the RSD 1248. In a further example, the rack includes one or more PCIe switches connecting the compute sleds 1240 to a set of disaggregated resources (e.g., RSD 1248).

The illustrations of FIGS. 9, 10, 11, and 12 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile ULE in industrial compute for smart city or smart factory, among many other examples).

In some implementations, some of the elements of edge computing node 1050 may be part of the platform 100 of FIG. 1. For example, the POD Manager 1242 and/or individual compute sleds 1240 may include one or more platforms 100 or portions thereof.

The respective compute platforms of FIGS. 9, 10, 11, and 12 may support multiple edge instances (e.g., edge clusters) by use of tenant containers running on a single compute platform. Likewise, multiple edge nodes may exist as sub-nodes running on tenants within the same compute platform. Accordingly, based on available resource partitioning, a single system or compute platform may be partitioned or divided into supporting multiple tenants and edge node instances, each of which may support multiple services and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

II. Example Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a power sequencing method to power up a computing platform in a low temperature environment, the method comprising: turning on, by a power sequencing controller (PSC), one or more power rails of a target component of the computing platform in response to detection of an ambient temperature of the computing platform or a temperature of the target component at or below a threshold temperature during a power up sequence; and turning off, by the PSC, the power rails in response to detection of the ambient temperature or the temperature of the target component at or above a target temperature.

Example 2 includes the method of example 1 and/or some other example(s) herein, further comprising: obtaining a temperature measurement from a thermal sensor; and determining that the computing platform is in the low temperature environment when the threshold temperature is above the obtained temperature measurement.

Example 3 includes the method of example 2 and/or some other example(s) herein, wherein the thermal sensor is a board thermal sensor attached to a motherboard of the computing platform.

Example 4 includes the method of example 3 and/or some other example(s) herein, wherein the temperature measurement from the thermal sensor is communicated from a baseboard management controller (BMC) over a first interface between the BMC and the PSC.

Example 5 includes the method of any of examples 1-4 and/or some other example(s) herein, wherein the temperature measurement is a first temperature measurement, and the method further comprises: obtaining a second temperature measurement from a digital thermal sensor (DTS) of the target component; and determining that the target component is at or above the target temperature when the target temperature is below the obtained second temperature measurement.

Example 6 includes the method of example 5 and/or some other example(s) herein, wherein the target component is a host processor of the computing platform, and the second temperature measurement is communicated from the BMC over the first interface.

Example 7 includes the method of example 6 and/or some other example(s) herein, wherein the second temperature measurement is communicated between the BMC and the host processor over a second interface between the BMC and the host processor.

Example 8 includes the method of example 5 and/or some other example(s) herein, wherein the target component is a platform controller hub (PCH) of the computing platform, and the second temperature measurement is communicated from the BMC over the first interface.

Example 9 includes the method of example 8 and/or some other example(s) herein, wherein the temperature measurement from the DTS is communicated between the BMC and the PCH over a third interface between the BMC and the PCH.

Example 10 includes the method of any of examples 1-9 and/or some other example(s) herein, further comprising: obtaining, from a BMC over a first interface between the BMC and the PSC, a force-on indication indicating that the computing platform is in the low temperature environment; and turning on the one or more power rails in response to receipt of the force-on indication.

Example 11 includes the method of example 10 and/or some other example(s) herein, further comprising: obtaining, from the BMC over the first interface, a force-off indication indicating that the target component is at or above the target temperature; and turning off the one or more power rails in response to receipt of the force-off indication.

Example 12 includes the method of example 11 and/or some other example(s) herein, wherein: when the target component is a host processor of the computing platform, the force-off indication is based on a temperature measurement communicated between a DTS of the host processor and the BMC over a second interface between the BMC and the DTS; and when the target component is a PCH of the computing platform, and the force-off indication is based on a temperature measurement communicated between a DTS of the PCH and the BMC over a third interface between the BMC and the PCH.

Example 13 includes the method of example 12 and/or some other example(s) herein, wherein the force-off indication is further based on a temperature measurement communicated to the BMC by a board thermal sensor over a fourth interface between the BMC and the board thermal sensor, wherein the temperature measurement is measured after the power rails are turned on.

Example 14 includes the method of example 13 and/or some other example(s) herein, wherein the force-on indication is based on a temperature measurement communicated to the BMC by a board thermal sensor over the fourth interface, wherein the temperature measurement is measured before the power rails are turned on.

Example 15 includes the method of any of examples 4-14 and/or some other example(s) herein, wherein the first interface is a General Purpose Input/Output (GPIO) interface or a System Management Bus (SMBus); the second interface is a platform environment interface (PECI); the third interface is a system management link (SMLink); and the fourth interface is an SMBus interface different than the first interface.

Example 16 includes the method of any of examples 1-15 and/or some other example(s) herein, further comprising: halting transmission of a reset signal for the target component to prevent the target component from initializing a boot sequence.

Example 17 includes the method of example 16 and/or some other example(s) herein, wherein the computing platform further comprises a PCH, and halting transmission of the reset signal comprises: asserting a PCH Power OK signal (PCH_PWROK) to the PCH to prevent the PCH from triggering a power cycle reset.

Example 18 includes the method of example 17 and/or some other example(s) herein, further comprising: halting a cooling system for the computing platform while the power rails are turned on.

Example 19 includes the method of example 18 and/or some other example(s) herein, wherein halting the cooling system comprises: instructing the BMC to drive one or more pulse width modulation output signals to the cooling system low or off.

Example 20 includes the method of any of examples 1-19 and/or some other example(s) herein, wherein the computing platform is implemented in a server computer device or an Internet of Things (IoT) device, and the PSC is a complex programmable logic device (CPLD), an application-specific integrated circuit (ASIC), or a field-programmable gate arrays (FPGA).

Example 21 includes a power sequencing method to power up a computing platform in a low temperature environment, the computing platform comprising a host processor, a platform controller hub (PCH), and a power sequencing controller (PSC), and the method comprises: turning, by the PSC, on a plurality of voltage rails of the host processor and/or the PCH when a temperature of the host processor is determined to be at or below a threshold temperature prior to executing a power up sequence, when a temperature of the PCH is determined to be at or below the threshold temperature prior to executing the power up sequence, and/or when an ambient temperature of the computing platform is determined to be at or below the threshold ambient temperature prior to executing the power up sequence; and turning, by the PSC, off the plurality of the voltage rails when the ambient temperature, the temperature of the host processor, and/or the temperature of the PCH is determined to reach or exceed a target operating temperature.

Example 22 includes the method of example 21 and/or some other example(s) herein, further comprising: obtaining a force-on indication from the PCH, the force-on indication indicating that the ambient temperature of the computing platform is determined to be at or below the threshold ambient temperature; turning on the plurality of voltage rails in response to receipt of the force-on indication; and preventing the PCH from initializing a boot sequence while the voltage rails are turned on.

Example 23 includes the method of any of examples 21-22 and/or some other example(s) herein, further comprising: obtaining a force-off indication from the PCH, the force-off indication indicating that the temperature of the host processor and the temperature of the PCH is determined to reach or exceeding the target operating temperature; and turning off the plurality of voltage rails in response to receipt of the force-off indication.

Example 24 includes the method of any of examples 21-23 and/or some other example(s) herein, wherein the computing platform architecture is a System on Chip (SoC) or a Multi-Chip Package (MCP), and the PSC is a complex programmable logic device (CPLD), an application-specific integrated circuit (ASIC), or a field-programmable gate arrays (FPGA).

Example 25 includes the method of any of examples 21-24 and/or some other example(s) herein, wherein the computing platform is implemented in an edge server device, a server computer device, an Internet of Things (IoT) device, or edge an IoT device.

An example implementation is an edge computing system, including respective edge processing devices and nodes to invoke or perform the operations of examples 1-25, or other subject matter described herein. Another example implementation is a client endpoint node, operable to invoke or perform the operations of examples 1-25, or other subject matter described herein. Another example implementation is an aggregation node, network hub node, gateway node, or core data processing node, within or coupled to an edge computing system, operable to invoke or perform the operations of examples 1-25, or other subject matter described herein. Another example implementation is an access point, base station, road-side unit, street-side unit, or on-premise unit, within or coupled to an edge computing system, operable to invoke or perform the operations of examples 1-25, or other subject matter described herein. Another example implementation is an edge provisioning node, service orchestration node, application orchestration node, or multi-tenant management node, within or coupled to an edge computing system, operable to invoke or perform the operations of examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples 1-25, or other subject matter described herein. Another example implementation is an edge computing system operable as an edge mesh, as an edge mesh with side car loading, or with mesh-to-mesh communications, operable to invoke or perform the operations of examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of examples 1-25, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples 1-25, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples 1-25, or other subject matter described herein.

Example Z01 includes an apparatus comprising means to perform one or more elements of a method described in or related to any of examples 1-25, or any other method or process described herein. Example Z02 includes one or more non-transitory computer-readable media comprising instructions, wherein execution of the instructions by an electronic device is operable to cause the electronic device to perform one or more elements of a method described in or related to any of examples 1-25, and/or any other method or process described herein. Example Z03 includes a computer program comprising instructions, wherein execution of the program by a processing element is operable to cause the processing element to carry out the method, techniques, or process as described in or related to any of examples 1-25, and/or portions thereof. Example Z04 includes an apparatus comprising logic, modules, or circuitry to perform one or more elements of a method described in or related to any of examples 1-25, and/or any other method or process described herein. Example Z05 includes an apparatus configured to perform one or more elements of a method described in or related to any of examples 1-25, and/or any other method or process described herein. Example Z06 includes a method, technique, or process as described in or related to any of examples 1-25, and/or portions or parts thereof. Example Z07 includes an apparatus comprising: processor circuitry and computer-readable media comprising instructions, wherein the one or more processors are configurable to perform the method, techniques, or process as described in or related to any of examples 1-25, and/or portions thereof. Example Z08 includes a signal as described in or related to any of examples 1-25, and/or portions or parts thereof. Example Z09 includes a datagram, packet, frame, segment, protocol data unit (PDU), or message as described in or related to any of examples 1-25, or portions or parts thereof, and/or otherwise described in the present disclosure. Example Z10 includes a signal encoded with a datagram, packet, frame, segment, PDU, or message as described in or related to any of examples 1-25, or portions or parts thereof, or otherwise described in the present disclosure. Example Z11 includes a signal encoded with data as described in or related to any of examples 1-25, or portions or parts thereof, or otherwise described in the present disclosure. Example Z12 includes an electromagnetic signal carrying computer-readable instructions, wherein execution of the computer-readable instructions by one or more processors is operable or configurable to cause the one or more processors to perform a method, technique, or process as described in or related to any of examples 1-25, or portions thereof. Example Z13 includes an API or specification defining functions, methods, variables, data structures, protocols, etc., defining or involving use of any of examples 1-25 or portions thereof, or otherwise related to any of examples 1-25 or portions thereof. Example Z14, includes a Multi-access Edge Computing (MEC) host executing a service as part of one or more MEC applications instantiated on a virtualization infrastructure, the service being related to any of examples 1-25 or portions thereof, and wherein the MEC host is configured to operate according to a standard from one or more ETSI MEC standards families. Example Z15 includes a signal in a wireless network as shown and described herein. Example Z16 includes a method of communicating in a wireless network as shown and described herein. Example Z17 includes a system for providing wireless communication as shown and described herein. Example Z18 includes a device for providing wireless communication as shown and described herein.

III. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "host processor" refers to a primary processing unit in a platform, traditionally called a Central Processing Unit (CPU), an Application Processing Unit (APU), a System on Chip (SoC), and/or the like. The host processor is the processing unit on which the primary operating system (and/or hypervisor), as well as user applications run. The host processor is also responsible for loading and executing Host Processor Boot Firmware and Host Processor Runtime Firmware. The term "Host Processor" and "Boot Processor" may be considered synonyms for purposes of the present disclosure. The term "non-host processor" refers to any processing unit on a platform that is not a host processor (e.g., a microcontroller, co-processor, reconfigurable device, etc). For the purposes of the present disclosure, the term "non-host processor" may be considered a synonym for "secondary processor", those CPUs that might be on an SoC, for example, that are not the host (or "boot") processor.

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "entity" refers to a distinct component of an architecture or device, or information transferred as a payload. The term "controller" refers to an element or entity that has the capability to affect a physical entity, such as by changing its state or causing the physical entity to move.

The term "device" refers to a physical entity embedded inside, or attached to, another physical entity in its vicinity, with capabilities to convey digital information from or to that physical entity. The term "device" may refer to any computing, input/output, or storage element, or any collection of computing, input/output or storage elements, on a platform. An example of a device is a central processing unit (CPU), Application Processing Unit (APU), embedded controller (EC), BMC, Trusted Platform Module (TPM), graphics processing unit (GPU), network interface controller (NIC), hard disk drive (HDD), solid state drive (SSD), Read Only Memory (ROM), flash ROM, or any of the large number of other possible devices. If at all possible, use a more specific term. For purposes of the present disclosure, the term "component" may be synonymous with the term "device."

The term "platform" refers to an assembly or set of devices assembled and working together to deliver a specific computing function. A platform is usually independent of any operating system, user applications, or user data. In some cases, a platform does not include any software other than the platform firmware as part of the devices in the platform. Platform firmware is a collection of firmware elements used to operate platform devices, and generally includes platform boot firmware and platform runtime firmware. The platform boot firmware is initially loaded by a platform at power-on to initialize the platform hardware and then hands control to a boot loader or OS. The platform runtime firmware includes any firmware that can provide functions that can be invoked by an OS, but whose functions are still concerned only with the platform hardware. Examples of platforms include an SoC, a motherboard, or a complete system such as a workstation, a server, a desktop computer, a laptop or notebook computer, a network switch, a blade, a smartphone, a tablet computer, a wearable device, an IoT device, a networked appliance, and/or other like computer systems.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy. As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge. Additionally, the term "edge IoT device" may refer to a gateway or IoT gate, IoT hub, or the like, and as such, these terms may be interchangeable.

As used herein, the term "compute node" or "compute device" refers to an identifiable entity implementing an aspect of edge computing operations, whether part of a larger system, distributed collection of systems, or a stand-alone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The terms "computer system", "computing system", and/or "system" as used herein refers to any type interconnected electronic devices, computer devices, or components thereof. Additionally, the terms "computer system", "computing system", and/or "system" may refer to various components of a computer that are communicatively coupled with one another. Furthermore, the terms "computer system", "computing system", and/or "system" may refer to multiple computer devices and/or multiple computing systems that are communicatively coupled with one another and configured to share computing and/or networking resources. A system may refer to an entirety of a computing entity, including all elements in a platform (hardware, firmware) and software (operating system, user applications, user data). A system can be thought of both as a logical construct (e.g. a software stack) or physical construct (e.g. a notebook, a desktop, a server, a network switch, etc.). In some cases, the terms the terms "computer system", "computing system", and/or "system" may be synonymous with the term "platform" or the like.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween. The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "network function virtualization" (or NFV) indicates the migration of NFs from embedded services inside proprietary hardware appliances to software-based virtualized NFs (or VNFs) running on standardized CPUs (e.g., within standard x86@ and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AL/ML application" or the like may be an application that contains some ALI/L models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "session" refers to a temporary and interactive information interchange between two or more communicating devices, two or more application instances, between a computer and user, or between any two or more entities or elements.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. One or more non-transitory computer-readable media comprising machine-readable instructions to cause a power sequencing controller (PSC) to at least:
responsive to detection of an ambient temperature of a computing platform below a threshold ambient temperature or a temperature of a target component of the computing platform below a threshold operating temperature, respectively, during a power up sequence at a first time,
cause a power state of the target component to change from a first power state to a second power state, the target component to receive signals to cause the target component to perform one or more operations of a boot sequence for the computing platform in the first power state, the performance of the one or more operations of the boot sequence by the target component paused when the target component is in the second power state; and
turn on a first power rail to heat the target component when the target component is in the second power state; and
responsive to detection of the ambient temperature at or above the threshold ambient temperature or the temperature of the target component at or above the threshold operating temperature, respectively, at a second time after the first time,
turn off the first power rail; and
cause the power state of the target component to change from the second power state to the first power state.

2. The one or more non-transitory computer-readable media of claim 1, wherein the machine-readable instructions are to cause the PSC to
determine that the computing platform is in a low temperature environment when a temperature measurement output by a thermal sensor is below the threshold ambient temperature.

3. The one or more non-transitory computer-readable media of claim 2, wherein the thermal sensor is a board thermal sensor attached to a motherboard of the computing platform.

4. The one or more non-transitory computer-readable media of claim 3, wherein the machine-readable instructions are to cause the PSC to obtain the temperature measurement over a first interface between a baseboard management controller (BMC) and the PSC.

5. The one or more non-transitory computer-readable media of claim 4, wherein the temperature measurement is a first temperature measurement, and the machine-readable instructions are to cause the PSC to
determine that the temperature of the target component is at or above the threshold operating temperature when a second temperature measurement is at or above the threshold operating temperature, the second temperature measurement output by a digital thermal sensor (DTS) of the target component.

6. The one or more non-transitory computer-readable media of claim 5, wherein the machine-readable instructions are to cause the PSC to obtain the second temperature measurement from the BMC over the first interface.

7. The one or more non-transitory computer-readable media of claim 6, wherein the target component is a host processor of the computing platform, and the second temperature measurement is communicated between the BMC and the host processor over a second interface between the BMC and the host processor.

8. The one or more non-transitory computer-readable media of claim 6, wherein the target component is a platform controller hub (PCH) of the computing platform, and the second temperature measurement is communicated between the BMC and the PCH over a second interface between the BMC and the PCH.

9. The one or more non-transitory computer-readable media of claim 1, wherein the machine-readable instructions are to cause the PSC to
turn on the first power rail in response to receipt of a force-on indication, the force-on indication indicating that the computing platform is in a low temperature environment, the force-on indication communicated by a baseboard management controller (BMC) over a first interface between the BMC and the PSC.

10. The one or more non-transitory computer-readable media of claim 9, wherein the force-on indication is based on a temperature measurement communicated to the BMC by a board thermal sensor over a second interface between the BMC and the board thermal sensor, the second interface different than the first interface, wherein the temperature measurement is measured before the first power rail is turned on.

11. The one or more non-transitory computer-readable media of claim 10, wherein the machine-readable instructions are to cause the PSC to halt transmission of a reset signal for the target component to cause the power state of the target component to enter the second power state.

12. The one or more non-transitory computer-readable media of claim 11, wherein the machine-readable instructions are to cause the PSC to halt operation of a cooling system for the computing platform while the first power rail is turned on.

13. The one or more non-transitory computer-readable media of claim 1, wherein the machine-readable instructions are to cause the PSC to
turn off the first power rail in response to receipt of a force-off indication, the force-off indication indicating that the temperature of the target component is at or above the threshold operating temperature, the force-off indication communicated by a baseboard management controller (BMC) over a first interface between the BMC and the PSC.

14. The one or more non-transitory computer-readable media of claim 13, wherein:
when the target component is a host processor of the computing platform, the force-off indication is based on a temperature measurement communicated between a digital thermal sensor (DTS) of the host processor and the BMC over a second interface between the BMC and the DTS; and
when the target component is a platform controller hub (PCH) of the computing platform, the force-off indication is based on a temperature measurement communicated between a DTS of the PCH and the BMC over a third interface between the BMC and the PCH.

15. The one or more non-transitory computer-readable media of claim 13, wherein the force-off indication is based on a temperature measurement communicated to the BMC by a board thermal sensor over a second interface between the BMC and the board thermal sensor, the second interface different than the first interface, wherein the temperature measurement is measured after the first power rail is turned on.

16. The one or more non-transitory computer-readable media of claim 14, wherein:
the first interface is a General Purpose Input/Output (GPIO) interface or a System Management Bus (SMBus);
the second interface is a platform environment interface (PECI);
the third interface is a system management link (SM-Link);
an architecture of the computing platform is a System on Chip (SoC) or a Multi-Chip Package (MCP);
the computing platform is implemented in an edge compute node, a cloud compute node, a server computer device, an Internet of Things (IoT) device, or an edge IoT device; and
the PSC is a complex programmable logic device (CPLD), an application-specific integrated circuit (ASIC), or a field-programmable gate array (FPGA).

17. The one or more non-transitory computer-readable media of claim 1, wherein the machine-readable instructions are to cause the PSC to, responsive to a user input, cause power to be supplied to a second power rail to wake the computing platform from a sleep state to a wake state.

18. A method to power up a computing platform in a low temperature environment, comprising:
responsive to determining that (a) a temperature of a target component of the computing platform fails to satisfy a threshold operating temperature during a power up sequence at a first time, or (b) an ambient temperature of the computing platform fails to satisfy a threshold ambient temperature during the power up sequence at the first time,
causing, by at least one processor circuit programmed by at least one instruction, a power state of the target component to change from a first power state to a second power state, the target component to receive signals to cause the target component to perform one or more operations of a boot sequence for the computing platform in the first power state, the performance of the one or more operations of the boot sequence by the target component paused when the target component is in the second power state; and
turning on, by one or more of the at least one processor circuit, a first voltage rail to heat the target component when the target component is in the second power state; and
responsive to determining that the temperature of the target component satisfies the threshold operating temperature or the ambient temperature satisfies the threshold ambient temperature, respectively, at a second time after the first time,
turning off, by one or more of the at least one processor circuit, the first voltage rail; and
causing, by one or more of the at least one processor circuit, the power state of the target component to change from the second power state to the first power state.

19. The method of claim 18, wherein the target component is a platform controller hub (PCH) of the computing platform, and further including
turning on the first voltage rail in response to receipt of a force-on indication, the force-on indication indicating that the ambient temperature of the computing platform is below the threshold ambient temperature.

20. The method of claim 18, further including
turning off the first voltage rail in response to receipt of a force-off indication, the force-off indication indicating that the temperature of the target component is at or exceeds the threshold operating temperature.

21. The method of claim 18, wherein an architecture of the computing platform is a System on Chip (SoC) or a Multi-Chip Package (MCP), and the computing platform is implemented in an edge server device, a server computer device, an Internet of Things (IoT) device, or an edge IoT device; and one or more of the at least one processor circuit is a complex programmable logic device (CPLD), an application-specific integrated circuit (ASIC), or a field-programmable gate arrays (FPGA).

22. An apparatus comprising:
interface circuitry;
machine-readable instructions; and
at least one processor circuit to be programmed by the machine-readable instructions to:
responsive to a determination that an ambient temperature of a computing platform fails to satisfy a threshold ambient temperature of a temperature of a target component of the computing platform fails to satisfy a threshold operating temperature, respectively, during a power up sequence at a first time cause a power state of the target component to change from a first power state to a second power state, the target component to receive signals to cause the target component to perform one or more operations of a boot sequence for the computing platform in the first power state, the performance of the one or more operations of the boot sequence paused when the target component is in the second power state; and turn on a first voltage rail to heat the target component when the target component is in the second power state; and responsive to a determination that the ambient temperature satisfies the threshold ambient temperature or the temperature of the target component satisfies the threshold operating temperature, respectively, at a second time after the first time, turn off the first voltage rail; and cause the target component to change from the second power state to the first power state.

23. The apparatus of claim 22, wherein the target component is a platform controller hub (PCH) of the computing platform, and one or more of the at least one processor circuit is to cause the first voltage rail to be turned on in response to receipt of a force-on indication, the force-on indication indicating that the ambient temperature of the computing platform is below the threshold ambient temperature.

24. The apparatus of claim 22, wherein one or more of the at least one processor circuit is to cause the first voltage rail to be turned off in response to receipt of a force-off indication, the force-off indication indicating the temperature of the target component is at or exceeds the threshold operating temperature.

25. The apparatus of claim 22, wherein one or more of the at least one processor circuit is to:

determine that the computing platform is in a low temperature environment when a first temperature measurement is below the threshold ambient temperature, the first temperature measurement output by a board thermal sensor attached to a motherboard of the computing platform; and determine that the temperature of the target component is at or above the threshold operating temperature when a second temperature measurement is above the threshold operating temperature, the second temperature measurement output by a digital thermal sensor (DTS) of the target component.

26. The apparatus of claim 25, wherein the first temperature measurement is communicated over a General Purpose Input/Output (GPIO) interface or a System Management Bus (SMBus) interface between a baseboard management controller (BMC) and one or more of the at least one processor circuit, and one or more of:

the second temperature measurement is communicated by the BMC over the GPIO interface or the SMBus;

the second temperature measurement is communicated over a platform environment interface (PECI) between the BMC and the DTS; or the second temperature measurement is communicated between the BMC and a platform controller hub (PCH) over a system management link (SMLink) between the BMC and the PCH.

27. The apparatus of claim 26, wherein a force-on indication and a force-off indication are communicated over the GPIO interface or the SMBus interface, and the force-on indication and the force-off indication are based on temperature measurements communicated between the DTS and the BMC over the PECI or another SMBus interface between the BMC and the DTS, the force-on indication associated with the turning on of the first voltage rail and the force-off indication associated with the turning off of the first voltage rail.

28. The apparatus of claim 25, wherein one or more of the at least one processor circuit is to instruct the BMC to drive one or more pulse width modulation output signals to a cooling system to low or off while the first voltage rail is turned on.

29. The apparatus of claim 22, wherein the target component is a platform controller hub (PCH), and one or more of the at least one processor circuit is to assert a PCH Power OK signal (PCH_PWROK) to the PCH to prevent the PCH from triggering a power cycle reset.

30. The apparatus of claim 22, wherein one or more of the at least one processor circuit is a complex programmable logic device (CPLD), an application-specific integrated circuit (ASIC), or a field-programmable gate array (FPGA); and the computing platform is a System on Chip (SoC) or a Multi-Chip Package (MCP) implemented in an edge compute node, a cloud compute node, a server computer device, an Internet of Things (IoT) device, or an edge IoT device.

\* \* \* \* \*